United States Patent
Suzuki et al.

(10) Patent No.: US 10,514,996 B2
(45) Date of Patent: Dec. 24, 2019

(54) SIMULATION REPRODUCING APPARATUS AND COMPUTER-READABLE RECORDING MEDIUM

(71) Applicant: MITSUBISHI ELECTRIC CORPORATION, Tokyo (JP)

(72) Inventors: Hirokazu Suzuki, Tokyo (JP); Takehisa Mizuguchi, Tokyo (JP); Minoru Nakamura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/077,380

(22) PCT Filed: Apr. 12, 2016

(86) PCT No.: PCT/JP2016/061782
§ 371 (c)(1),
(2) Date: Aug. 10, 2018

(87) PCT Pub. No.: WO2017/179120
PCT Pub. Date: Oct. 19, 2017

(65) Prior Publication Data
US 2019/0057020 A1    Feb. 21, 2019

(51) Int. Cl.
*G06F 11/34*    (2006.01)
*G06F 9/455*    (2018.01)
(Continued)

(52) U.S. Cl.
CPC .......... *G06F 11/3461* (2013.01); *G06F 9/455* (2013.01); *G06F 11/261* (2013.01);
(Continued)

(58) Field of Classification Search
CPC .... G06F 9/455; G06F 11/261; G06F 11/3457; G06F 11/3461; G06F 11/36; G06F 11/3664
(Continued)

(56) References Cited

U.S. PATENT DOCUMENTS 5,566,300 A    10/1996  Naoe
6,823,299 B1 *  11/2004  Contreras ............... G06F 8/24
                                            345/419
(Continued)

FOREIGN PATENT DOCUMENTS

JP    07-271629 A    10/1995
JP    10-011118 A     1/1998
(Continued)

OTHER PUBLICATIONS

International Search Report for PCT/JP2015/063470 (PCT/ISA/210) dated Aug. 4, 2015.
(Continued)

*Primary Examiner* — Qing Chen
(74) *Attorney, Agent, or Firm* — Birch, Stewart, Kolasch & Birch LLP

(57) ABSTRACT

An acceptance control unit accepts, after simulation of a state change of a target system, a specified time which is a time in a simulation period being a target of the simulation. A reproduction unit selects a change time corresponding to the specified time from trace data and obtains a state value corresponding to the selected change time from the trace data. The reproduction unit generates a state image indicating a state corresponding to the obtained state value. A display unit displays the generated state image.

10 Claims, 32 Drawing Sheets

(51) Int. Cl.
  *G06F 11/26* (2006.01)
  *G06F 11/36* (2006.01)
(52) U.S. Cl.
  CPC .......... *G06F 11/3457* (2013.01); *G06F 11/36* (2013.01); *G06F 11/3664* (2013.01)
(58) Field of Classification Search
  USPC .............................. 717/124–135; 703/13–22
  See application file for complete search history.

(56) References Cited

U.S. PATENT DOCUMENTS

| | | | |
|---|---|---|---|
| 7,130,783 | B1 | 10/2006 | Harer et al. |
| 7,617,420 | B2 | 11/2009 | Kimura |
| 8,296,111 | B2 | 10/2012 | Moriyama |
| 2005/0289400 | A1 | 12/2005 | Kimura |
| 2009/0103902 | A1 | 4/2009 | Matsuura et al. |
| 2010/0100365 | A1 | 4/2010 | Moriyama |
| 2010/0180245 | A1 | 7/2010 | Rutten |
| 2011/0054841 | A1* | 3/2011 | Wang .................. G06F 11/3414 702/182 |
| 2012/0179447 | A1 | 7/2012 | Lin et al. |
| 2013/0055026 | A1 | 2/2013 | Hatano et al. |

FOREIGN PATENT DOCUMENTS

| | | |
|---|---|---|
| JP | 10-333938 A | 12/1998 |
| JP | 2000-268005 A | 9/2000 |
| JP | 2005-234617 A | 9/2005 |
| JP | 2006-012066 A | 1/2006 |
| JP | 2007-079756 A | 3/2007 |
| JP | 2007-334812 A | 12/2007 |
| JP | 2010-009497 A | 1/2010 |
| JP | 2010-097406 A | 4/2010 |
| JP | 2013-045184 A | 3/2013 |
| JP | 2013-161429 A | 8/2013 |
| WO | WO 2014/118897 A1 | 8/2014 |

OTHER PUBLICATIONS

International Search Report for PCT/JP2016/061782 (PCT/ISA/210) dated Jun. 28, 2016.
Ben Zarlingo, "Analyze Agile or Elusive Signals Using Real-Time Measurement and Triggering", Agilent Technologies Inc. 2013 (Year: 2013).
Communication pursuant to Article 94(3) EPC issued in related European Application No. 15 891 781.5 dated Nov. 29, 2018.
Office Action issued in related U.S. Appl. No. 15/559,776 dated Dec. 10, 2018.
Notice of Allowance issued in copending U.S. Appl. No. 15/559,776 dated Mar. 21, 2019.
Extended European Search Report issued in corresponding European Application No. 16898580.2 dated Feb. 21, 2019.

* cited by examiner

Fig. 7

210:TRACE DATA

```
time=-1 ; led1=0 ;
time=-1 ; sw1=0 ;
time=-1 ; sns1=0 ;
time=-1 ; sns1=50 ;
time=1000 ; led1 = 1 ;
time=2000 : sw1 = 1 :
time=3000 ; sns1=30 ;
time=5000 ; end ;
```

Fig. 12

210:TRACE DATA

```
time=200 ; sns1=10 ;  0 ;
time=300 ; sns1=30 ; 10 ;
time=400 ; sns1=50 ; 30 ;
```

Fig. 21

230:CONDITION DATA

```
#cd1 ; led1=1 ;
#cd2 ;  sw1=1 ;
```

Fig. 25

230:CONDITION DATA

```
*$L1 {
   #cd1 ;  led1 = 1 ;   go $L2  ;
   #cd2 ;   sw1 = 1 ;   go $L3  ;   }

$L2 {
   #cd3 ;  led1 = 0 ;   go $L1 ;   }

$L3 {
   #cd4 ;  sns1 > 24 ;  go $L1 ;   } cd5 ;  sns1 < 5 ;  ;
```

Fig. 27

230:CONDITION DATA

```
*$L1 {
  #cd1 ; led1 = 1 ;  go $L2  ; pause ;
  #cd2 ;  sw1 = 1 ;  go $L3  ; ; }

$L2 {
  #cd3 ; led1 = 0 ;  go $L1 ; ; }

$L3 {
  #cd4 ; sns1 > 24 ; go $L1 ; ;} cd5 ; sns1 < 5 ; ; spd = 2 ;
```

SIMULATION REPRODUCING APPARATUS AND COMPUTER-READABLE RECORDING MEDIUM

TECHNICAL FIELD

The present invention relates to a technique for reproducing a simulation.

BACKGROUND ART

In software development for embedded devices in recent years, a software simulator for simulating an operation of a system on which software runs is used in order to start software debugging early. By using the software simulator, software debugging can be performed before a hardware test environment of the system including a microcontroller and its peripheral devices is actually completed. The microcontroller is also referred to as a microcomputer or a microprocessor.

For example, a software simulator capable of graphically displaying a state of the peripheral device such as turning on and off of an LED and a state of the microcontroller such as a signal value input/output to a terminal of the microcontroller is known.

When software simulation is executed using this simulator, it is possible to visually recognize changes in the state of the microcontroller and the peripheral devices under simulation with a graphic display.

Patent Literature 1 discloses such a conventional simulator.

The conventional simulator disclosed in Patent Literature 1 operates as follows.

The conventional simulator records an occurrence time of a state change and an update value of the state as trace data during simulation execution and converts the occurrence time included in the trace data into a reproduction time for reproduction after the simulation ends. Then, the conventional simulator reads the trace data and reproduces the state change according to the reproduction time with the graphic display.

Since the conventional simulator can record the trace data and reproduce the state change without re-executing the simulation, the state change can be reproduced at high speed. Further, the conventional simulator can change a speed of reproduction by applying a speed ratio when converting an update time to the reproduction time.

The conventional simulator disclosed in Patent Literature 1 can reproduce the state change in order of time from a start time but cannot display a state at an arbitrary time according to a user's request.

For example, when the user visually recognizes an abnormality of the state at a time when the state change is reproduced for 30 minutes from the start time, the user wants to check the state a little before the time when the abnormality was visually recognized. This is to check whether another abnormality has occurred prior to visually recognizing the abnormality or to check history of the state change until the abnormality occurs. As described above, even when the user wants to check the state 30 minutes after the start time again, the state of any time cannot be displayed by the conventional simulator. Therefore, the user must operate the conventional simulator for 30 minutes. That is, it takes time to check the state again when using the conventional simulator.

Although it is possible to visually check the state change with the conventional simulator, visual check may be difficult in some cases.

It is difficult to detect the state change under a complicated condition, for example, when there are many points which meet conditions the user wants to check, when the condition the user wants to check is a combination of multiple state changes, or when the condition the user wants to check is the state change in a time series.

CITATION LIST

Patent Literature

Patent Literature 1: JP-A-2007-334812

SUMMARY OF INVENTION

Technical Problem

An object of the present invention is to make it possible to reproduce a state of a target system at an arbitrary time.

Solution to Problem

A simulation reproducing apparatus according to the present invention includes:

an accepting unit to accept, after simulation of a state change of a target system, a specified time which is a time in a simulation period being a target of the simulation;

a state management unit to select a change time corresponding to the specified time from trace data, which is data obtained by simulation of the state change of the target system and is the data including change times at which a state of the target system has changed and state values indicating the state of the target system, and to obtain the state value corresponding to the selected change time from the trace data; an image generation unit to generate a state image indicating a state corresponding to the obtained state value; and a display unit to display the generated state image.

Advantageous Effects of Invention

According to the present invention, it is possible to reproduce the state of the target system at an arbitrary time.

BRIEF DESCRIPTION OF DRAWINGS

FIG. 7 is a diagram illustrating an example of trace data 210 in Embodiment 1.

FIG. 12 is a diagram illustrating an example of the trace data 210 in Embodiment 1.

FIG. 21 is a diagram illustrating an example of condition data 230 in Embodiment 2.

FIG. 25 is a diagram illustrating an example of condition data 230 in Embodiment 3.

FIG. 27 is a diagram illustrating an example of condition data 230 in Embodiment 4.

DESCRIPTION OF EMBODIMENTS

Embodiment 1

A simulation reproducing apparatus 100 for reproducing simulation will be described with reference to FIGS. 1 to 18.

*Description of Configuration*

Figure 1:
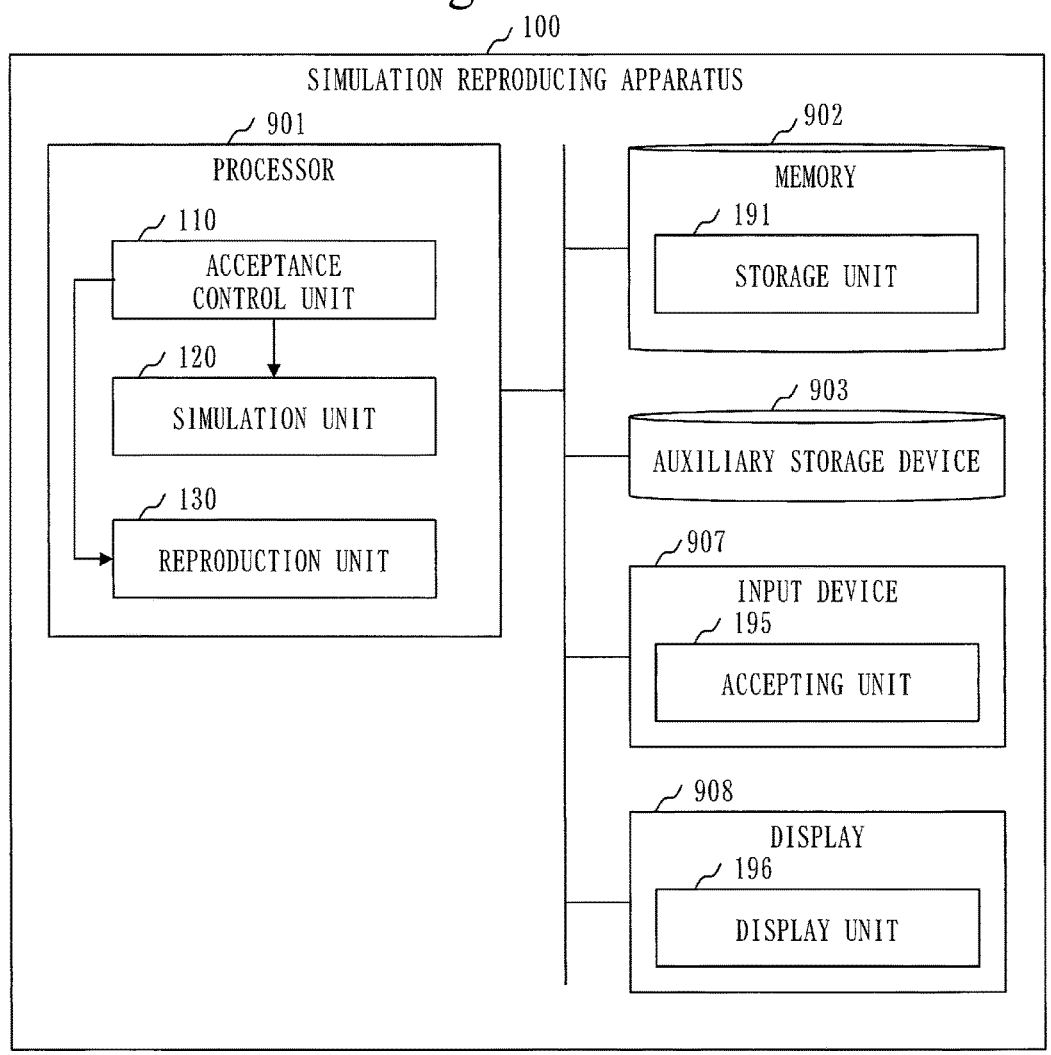
FIG. 1 is a structural diagram of a simulation reproducing apparatus 100 in Embodiment 1.

The configuration of the simulation reproducing apparatus 100 will be described with reference to FIG. 1.

The simulation reproducing apparatus 100 is a computer including hardware such as a processor 901, a memory 902, an auxiliary storage device 903, an input device 907, and a display 908. The processor 901 is connected to other hardware via signal lines.

The processor 901 is an Integrated Circuit (IC) that performs processing, and controls other hardware. Specifically, the processor 901 is a CPU, a DSP, or a GPU. The CPU is an abbreviation for Central Processing Unit, the DSP is an abbreviation for Digital Signal Processor, and the GPU is an abbreviation for Graphics Processing Unit.

The memory 902 is a volatile storage device. The memory 902 is also referred to as a main storage device or a main memory. Specifically, the memory 902 is a Random Access Memory (RAM).

The auxiliary storage device 903 is a nonvolatile storage device. Specifically, the auxiliary storage device 903 is a ROM, an HDD, or a flash memory. The ROM is an abbreviation for Read Only Memory, and the HDD is an abbreviation for Hard Disk Drive.

The input device 907 is a device that accepts an input. Specifically, the input device 907 is a keyboard, a mouse, a ten-key pad or a touch panel.

The display 908 is a display device for displaying images and the like. Specifically, the display 908 is a liquid crystal display. The display 908 is also referred to as a monitor.

The simulation reproducing apparatus 100 includes "units" such as an acceptance control unit 110, a simulation unit 120, and a reproduction unit 130 as elements of the functional configuration. A function of the "units" is realized by software. The function of the "units" will be described below.

A program for realizing the function of the "units" is stored in the auxiliary storage device 903. The program for realizing the function of the "units" is loaded into the memory 902 and executed by the processor 901.

Further, an Operating System (OS) is stored in the auxiliary storage device 903. At least a part of the OS is loaded into the memory 902 and executed by the processor 901.

That is, the processor 901 executes the program for realizing the function of the "units" while executing the OS.

Data obtained by executing the program for realizing the function of the "units" is stored in the storage device such as the memory 902, the auxiliary storage device 903, a register in the processor 901 or a cache memory in the processor 901.

It should be noted that the simulation reproducing apparatus 100 may include a plurality of processors 901, and the plurality of processors 901 may execute the program for realizing the function of the "units" in cooperation.

The memory 902 functions as a storage unit 191 in which data to be used, generated, input/output, or transmitted/received by the simulation reproducing apparatus 100 is stored. However, another storage device may function as the storage unit 191.

The input device 907 functions as an accepting unit 195 to accept the input.

The display 908 functions as a display unit 196 to display an image and the like.

The hardware including the processor 901, the memory 902, and the auxiliary storage device 903 is referred to as a "processing circuitry".

A "unit" may be read as "process" or "step". A function of the "unit" may be realized by firmware.

The program for realizing the function of the "units" can be stored in a nonvolatile storage medium such as a magnetic disk, an optical disk or a flash memory.

Figure 2:
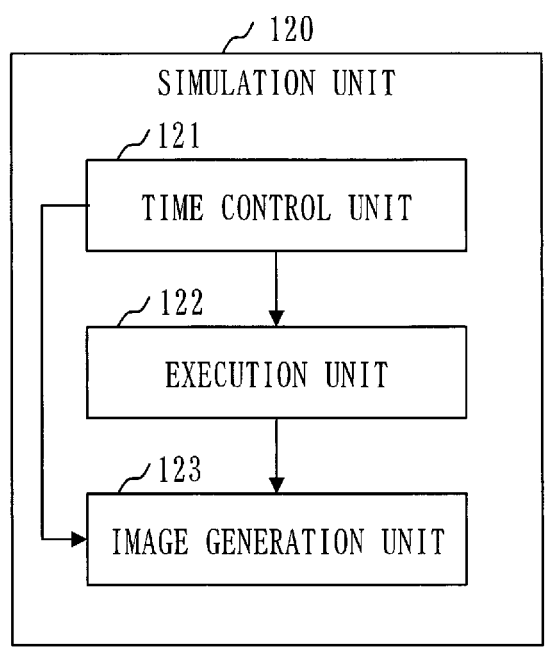
FIG. 2 is a structural diagram of a simulation unit 120 in Embodiment 1.

The functional configuration of the simulation unit 120 will be described with reference to FIG. 2.

The simulation unit 120 includes a time control unit 121, an execution unit 122, and an image generation unit 123 as the elements of functional configuration. These functions will be described below.

Figure 3:
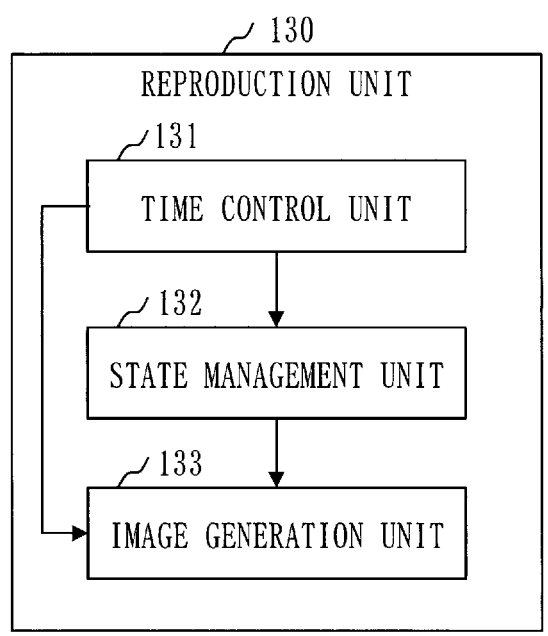
FIG. 3 is a structural diagram of a reproduction unit 130 in Embodiment 1.

The functional configuration of the reproduction unit 130 will be described with reference to FIG. 3.

The reproduction unit 130 includes a time control unit 131, a state management unit 132, and an image generation unit 133 as the elements of functional configuration. These functions will be described below.

*Description of Operation*

An operation of the simulation reproducing apparatus 100 corresponds to a simulation reproducing method. A procedure of the simulation reproducing method corresponds to a procedure of a simulation reproducing program.

Figure 4:
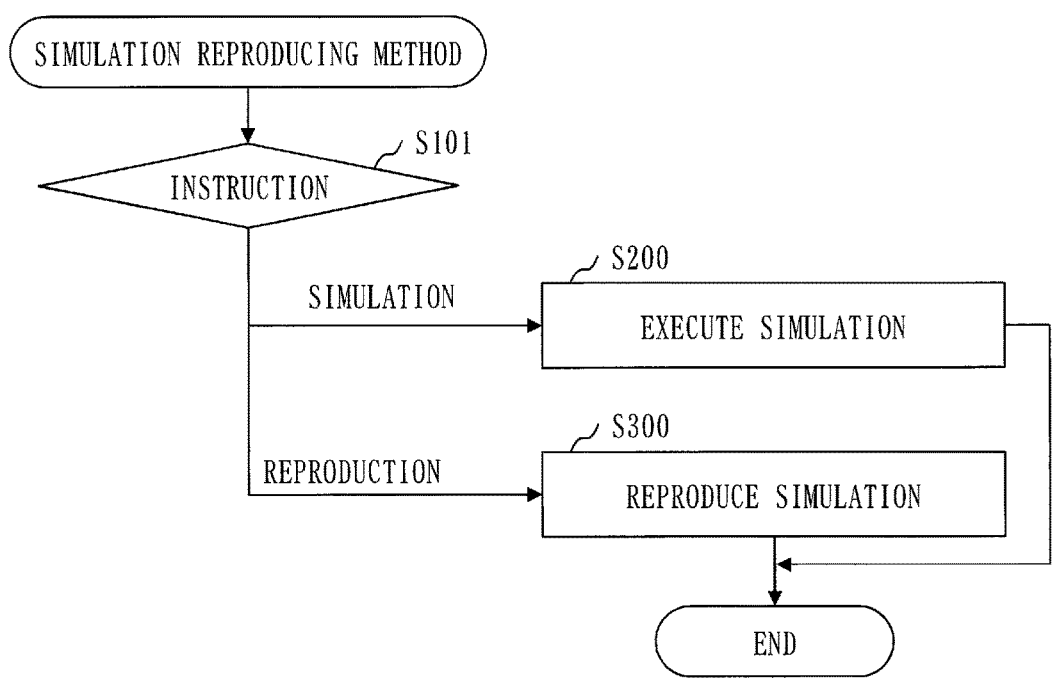
FIG. 4 is a flowchart of a simulation reproducing method in Embodiment 1.

The simulation reproducing method will be described with reference to FIG. 4.

In Step S101, the user operates the input device 907 to input a simulation instruction or a reproduction instruction to the simulation reproducing apparatus 100.

The simulation instruction is an instruction for executing a simulation.

The reproduction instruction is an instruction for reproducing the simulation after the simulation.

When the instruction is input, the accepting unit 195 accepts the input instruction.

Then, the acceptance control unit 110 determines a type of the accepted instruction.

When the accepted instruction is a simulation instruction, the process proceeds to Step S200.

When the accepted instruction is a reproduction instruction, the process proceeds to Step S300.

Step S200 is a simulation process.

In Step S200, the simulation unit 120 simulates a state change of a target system.

The target system is a system to be simulated.

The target system includes a microcontroller and peripheral devices. The microcontroller is also referred to as a microcomputer or a microprocessor.

The microcontroller includes hardware and software. Hardware is, for example, a processor, a memory, a register, a timer and a port. Software is a program to be incorporated into the target system.

The peripheral devices are devices such as an LED, a switch and a sensor.

The simulation process (S200) will be described in detail later.

Step S300 is a reproduction process.

In Step S300, the reproduction unit 130 reproduces the simulation.

The reproduction process (S300) will be described in detail later.

The simulation process (S200) will be described with reference to FIG. 5.

In Step S210, the image generation unit 123 generates a state image 200. Then, the display unit 196 displays the state image 200.

Figure 6:
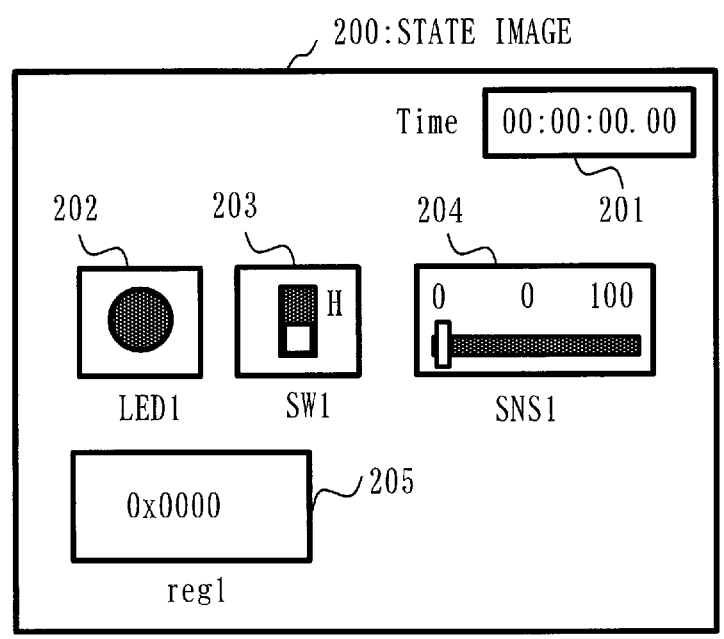
FIG. 6 is a diagram illustrating an example of a state image 200 in Embodiment 1.

The state image 200 will be described with reference to FIG. 6.

The state image 200 is an image used as a user interface for checking the state of the target system.

The state image 200 includes a time part 201, an LED part 202, a switch part 203, a sensor part 204, and a register part 205.

The time part 201 is a part indicating a time of the target system.

The LED part 202 is a part indicating a state of the LED of the target system.

The switch part 203 is a part indicating a state of the switch of the target system.

The sensor part 204 is a part indicating a state of the sensor of the target system.

The register part 205 is a part indicating a state of the register of the target system.

Each part included in the state image 200 and an initial state of each part are stored in advance in the storage unit 191. The image generation unit 123 generates the state image 200 using the parts and the initial states stored in the storage unit 191.

Returning to FIG. 5, description of Step S210 will be continued.

The execution unit 122 generates trace information indicating the initial state of the target system and registers the generated trace information in trace data 210.

The trace data 210 is data stored in the storage unit 191.

The trace data 210 will be described with reference to FIG. 7.

The trace data 210 includes one or more trace information. One row in the drawing corresponds to the trace information.

The trace information includes a time identifier, a trace time, a state identifier, and a state value.

The time identifier identifies the trace time. A specific time identifier is "time".

The trace time is a pre-start time, a change time or an end time.

The pre-start time is a time before the simulation. "time=−1" included in the trace information on a first row to a fourth row indicates the pre-start time.

The change time is a time when the state of the target system has changed. "time=xxxx" included in the trace information on a fifth row to a seventh row indicates the change time.

The end time is a time when the simulation is completed. "time=5000" included in the trace information on an eighth row indicates the end time. This trace information is last trace information. The last trace information includes an end identifier "end" instead of the state identifier.

The state identifier identifies the state to be simulated. "led 1" identifies the state of the LED of the target system. "sw 1" identifies the state of the switch of the target system. "sns 1" identifies the state of the sensor of the target system.

The state value is a value indicating the state identified by the state identifier. "led1=x" indicates the state value of the LED of the target system. "sw1=x" indicates the state value of the switch of the target system. "sns1=x" indicates the state value of the sensor of the target system.

Returning to FIG. 5, description of Step S210 will be continued.

Specifically, the execution unit 122 registers the trace information on the first row to the third row in FIG. 7 in the trace data 210. At this time, the trace information after the fourth row is not registered in the trace data 210.

In step S221, when the user wants to change the state of the target system, the user operates the input device 907 to input the state instruction to the simulation reproducing apparatus 100.

When the state instruction is input, the accepting unit 195 accepts the state instruction, and the process proceeds to Step S222.

When the state instruction is not input, the process proceeds to Step S223.

In step S222, the image generation unit 123 updates the state in the state image 200 according to the state instruction. Then, the display unit 196 displays the updated state image 200.

For example, when the state instruction to change the sensor value to 50 is accepted, the image generation unit 123 updates the sensor part 204 included in the state image 200 to the sensor part 204 indicating the sensor value "50".

The execution unit 122 generates the trace information corresponding to the state instruction and registers the generated trace information in the trace data 210.

For example, when the state instruction to change the sensor value to 50 is accepted, the execution unit 122 registers the trace information on the fourth row in FIG. 7 in the trace data 210. At this time, the trace information after the fifth row is not registered in the trace data 210.

In Step S223, when the user wants to start the simulation, the user operates the input device 907 to input a start instruction to the simulation reproducing apparatus 100.

When the start instruction is input, the accepting unit 195 accepts the start instruction, and the process proceeds to Step S230.

When the start instruction is not input, the process returns to Step S221.

In Step S230, the time control unit 121 updates a simulation time.

The simulation time is the time in the simulation. The simulation time is stored in the storage unit 191.

Specifically, the time control unit 121 increments the simulation time.

Then, the execution unit 122 simulates the target system at the updated simulation time. The simulation method is the same as that of the conventional simulation.

In Step S241, the execution unit 122 determines whether the state of the target system has changed.

When the state of the target system has changed, the process proceeds to Step S242.

When the state of the target system has not changed, the process proceeds to Step S244.

In Step S242, the image generation unit 123 updates the state in the state image 200 to the state after the change and updates the time in the state image 200 to the simulation time. Then, the display unit 196 displays the updated state image 200.

In Step S243, the execution unit 122 generates the trace information indicating the changed state and registers the generated trace information in the trace data 210.

For example, at the time of the value of the simulation time reaching 1000, when the LED changes from a light-off state to a light-on state, the execution unit 122 registers the trace information on the fifth row in FIG. 7 in the trace data 210. At this time, the trace information after the sixth row is not registered in the trace data 210.

In Step S244, the image generation unit 123 updates the time in the state image 200 to the simulation time. Then, the display unit 196 displays the updated state image 200.

In Step S251, when the user wants to change the state of the target system, the user operates the input device 907 to input the state instruction to the simulation reproducing apparatus 100.

When the state instruction is input, the accepting unit 195 accepts the state instruction, and the process proceeds to Step S252.

When the state instruction is not input, the process proceeds to Step S253.

In Step S252, the image generation unit 123 updates the state in the state image 200 according to the state instruction. Then, the display unit 196 displays the updated state image 200.

The execution unit 122 generates the trace information corresponding to the state instruction and registers the generated trace information in the trace data 210.

Steps S251 and S252 are the same as Steps S221 and S222.

In Step S253, when the user wants to end the simulation, the user operates the input device 907 to input an end instruction to the simulation reproducing apparatus 100.

When the end instruction is input, the accepting unit 195 accepts the end instruction, and the process proceeds to Step S254.

When the end instruction is not input, the process returns to Step S230.

In Step S254, the execution unit 122 generates the trace information including the simulation time as the end time and registers the generated trace information in the trace data 210.

Specifically, the execution unit 122 registers the trace information on the eighth row in FIG. 7 in the trace data 210.

Figure 8:
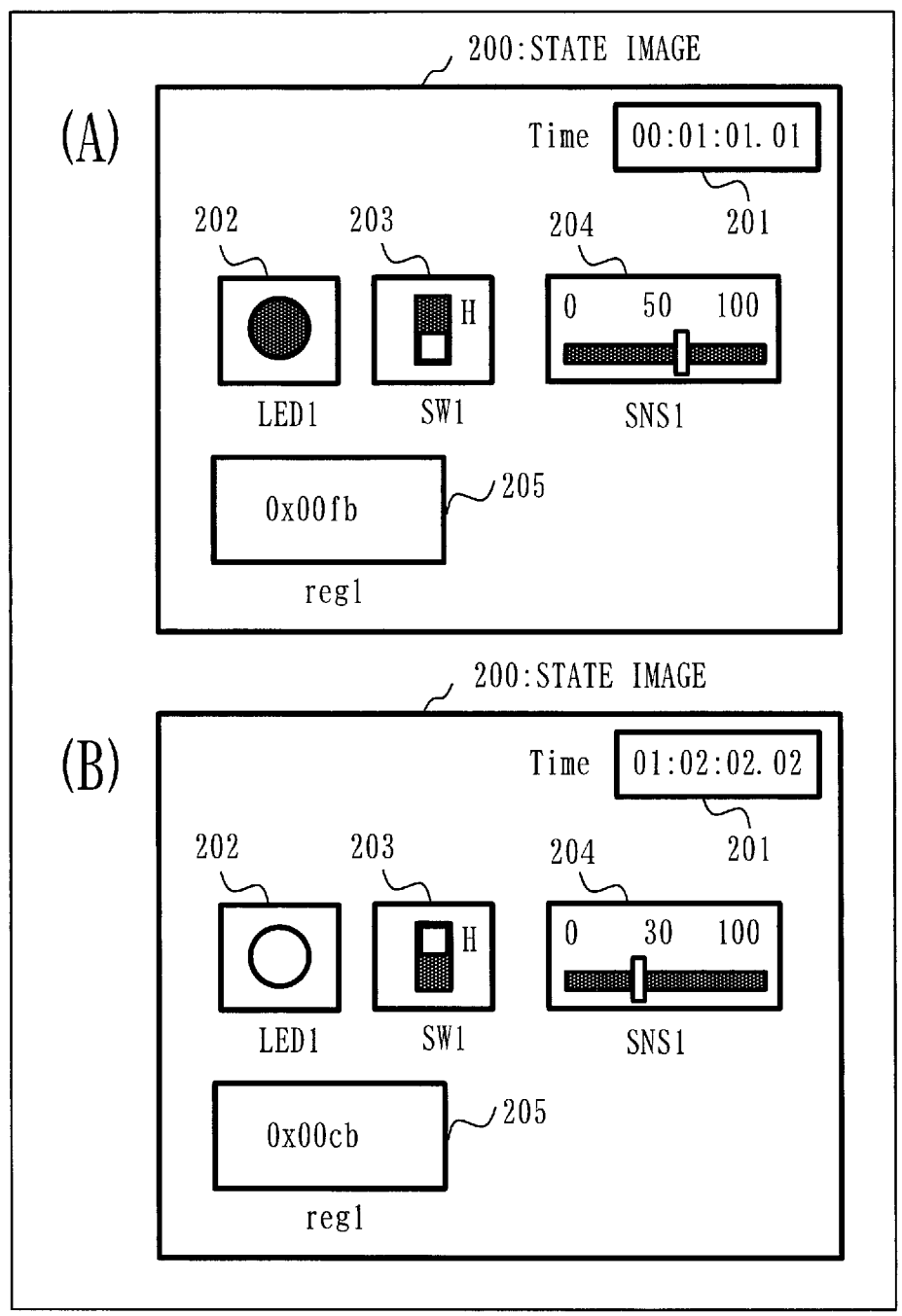
FIG. 8 is a diagram illustrating an example of the state image 200 in Embodiment 1.

FIG. 8 illustrates an example of the state image 200 that changes during the simulation.

In (A) of FIG. 8, the time part 201 indicates the simulation time "00:01:01.01". The LED part 202 indicates the LED which is turned off. Further, the switch part 203 indicates the switch being set to Low. The sensor part 204 indicates a current value "50" detected by the sensor. The register part 205 indicates a value "0x00fb" of the register.

In (B) of FIG. 8, the time part 201 indicates the simulation time "01:02:02.02". The LED part 202 indicates the LED which is turned on. Further, the switch part 203 indicates the switch being set to High. The sensor part 204 indicates the current value "30" detected by the sensor. The register part 205 indicates the value "0x00cb" of the register.

In the sensor part 204, the value indicated between "0" and "100" is the current value detected by the sensor. This current value corresponds to a position of a bar. That is, when the bar is moved, the current value changes.

Figure 9:
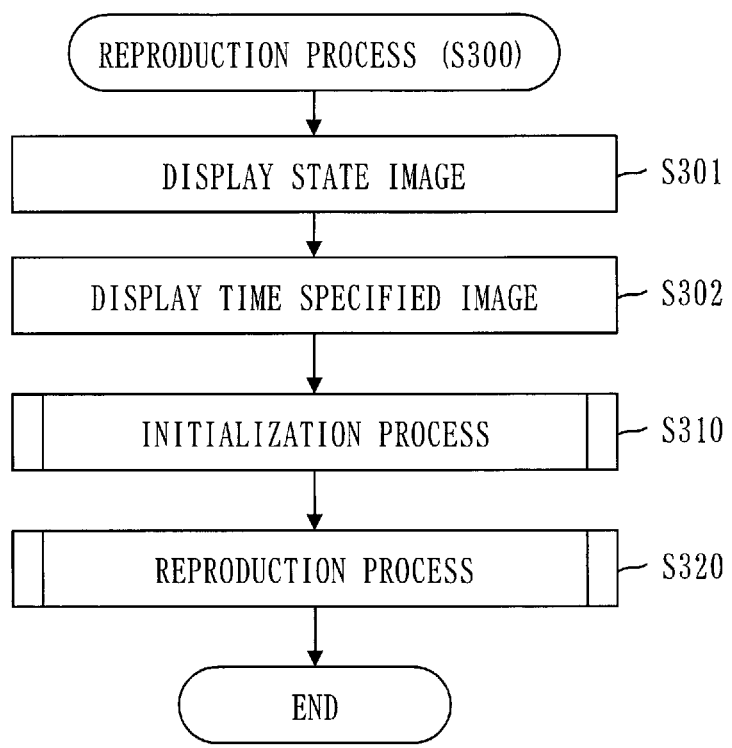
FIG. 9 is a flowchart of a reproduction process (S300) in Embodiment 1.

The reproduction process (S300) will be described with reference to FIG. 9.

In Step S301, the image generation unit 133 generates the state image 200. Then, the display unit 196 displays the state image 200.

Figure 5:
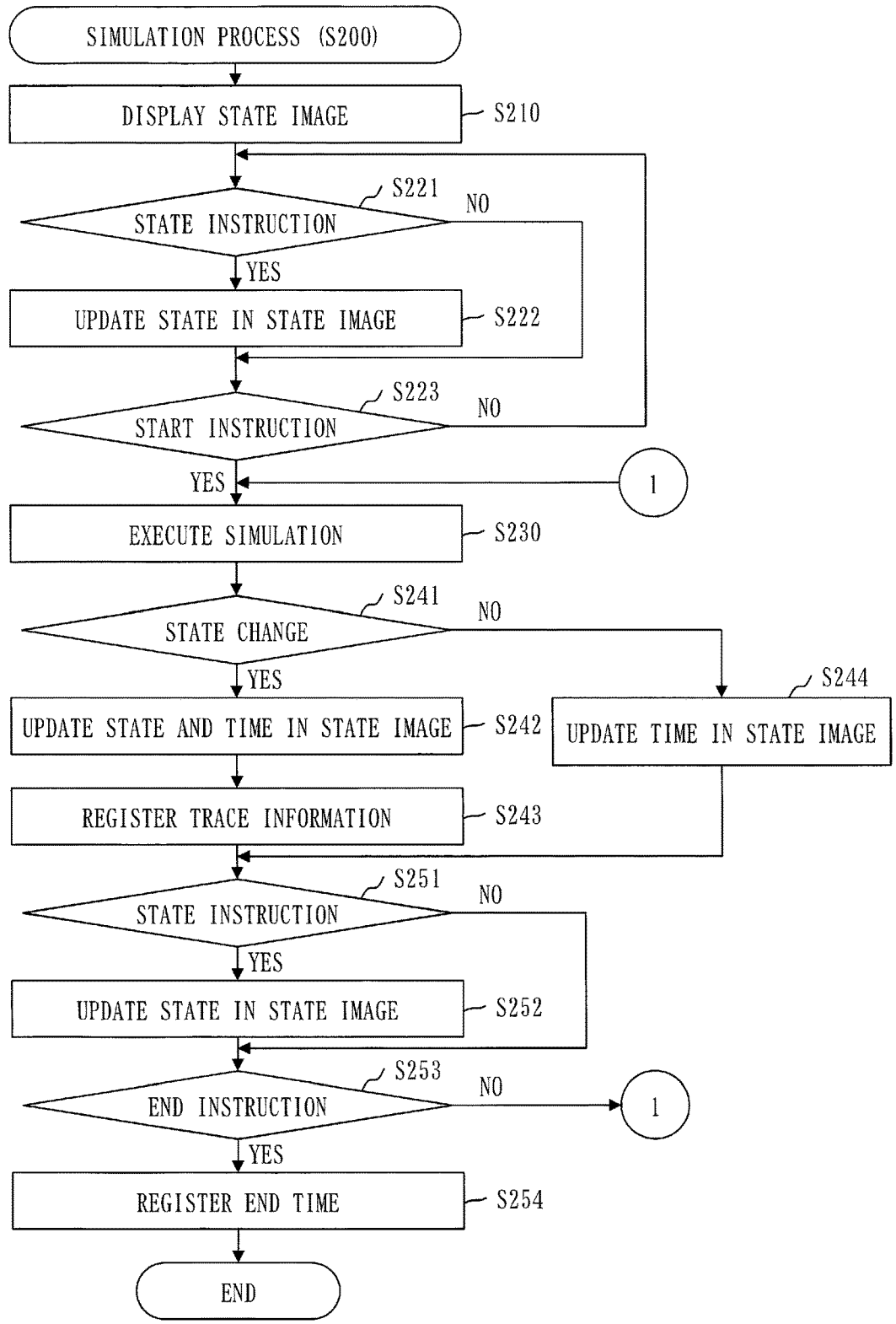
FIG. 5 is a flowchart of a simulation process (S200) in Embodiment 1.

Step S301 is the same as Step S210 of FIG. 5.

In Step S302, the image generation unit 133 generates a time specified image 220. Then, the display unit 196 displays the time specified image 220.

Specifically, the time specified image 220 is displayed side by side with the state image 200.

Figure 10:
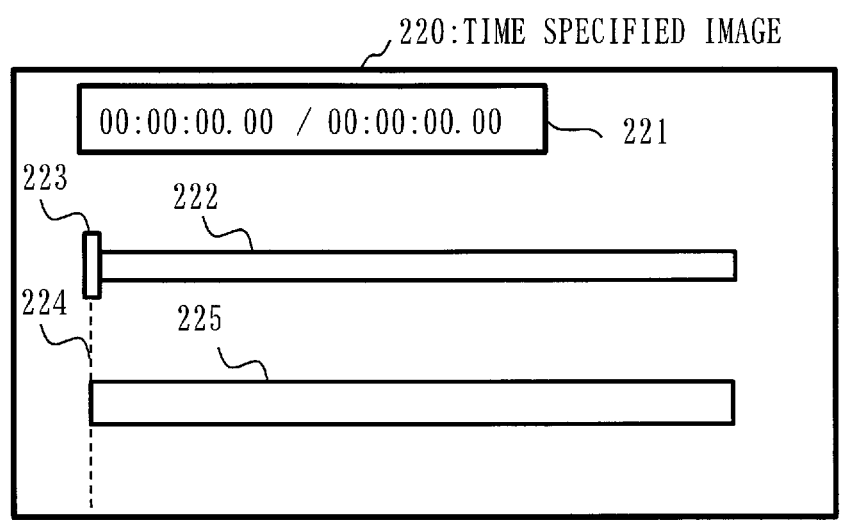
FIG. 10 is a diagram illustrating an example of a time specified image 220 in Embodiment 1.

The time specified image 220 will be described with reference to FIG. 10.

The time specified image 220 is an image used as the user interface for specifying the reproduction time.

The time specified image 220 includes a time part 221, a specified time axis 222, a knob 223, an auxiliary line 224, and a state time axis 225.

The time part 221 is a part indicating the reproduction time and the end time. The time on the left side is the reproduction time and the time on the right side is the end time. The reproduction time is the simulation time when the simulation is being reproduced. The end time is the simulation time when reproduction of the simulation ends. In FIG. 10, the reproduction time and the end time are initial values.

The specified time axis 222 is a part indicating a time axis corresponding to a simulation period and is arranged in parallel with the state time axis 225. The simulation period is a period from a start time to an end time of the simulation. A left end of the specified time axis 222 corresponds to the start time of the simulation, and a right end of the specified time axis 222 corresponds to the end time of the simulation.

The knob 223 is a part that moves along the specified time axis 222.

The auxiliary line 224 is a part corresponding to a symbol moving along the state time axis 225 in conjunction with the knob 223.

The state time axis 225 is a part indicating the time axis corresponding to the simulation period and is arranged in parallel with the specified time axis 222. A left end of the state time axis 225 corresponds to the start time of the simulation, and a right end of the state time axis 225 corresponds to the end time of the simulation.

In the subsequent process, a change line 226 is attached to a position corresponding to the change time on the state time axis 225. The change line 226 is a part corresponding to a symbol attached to the position corresponding to the change time.

Each part included in the time specified image 220 and the initial values of the time part 221 are stored in advance in the storage unit 191. The image generation unit 133 generates the time specified image 220 using the parts and the initial values stored in the storage unit 191.

Returning to FIG. 9, the description will be continued from Step S310.

Step S310 is an initialization process.

In Step S310, the reproduction unit 130 adds the state value before the change to the trace information included in the trace data 210.

Further, the reproduction unit 130 updates the state in the state image 200 to the state at the start time of the simulation.

Furthermore, the reproduction unit 130 updates the last time indicated in the time part 221 of the time specified image 220, and attaches the change line 226 to the state time axis 225 of the time specified image 220.

Figure 11:
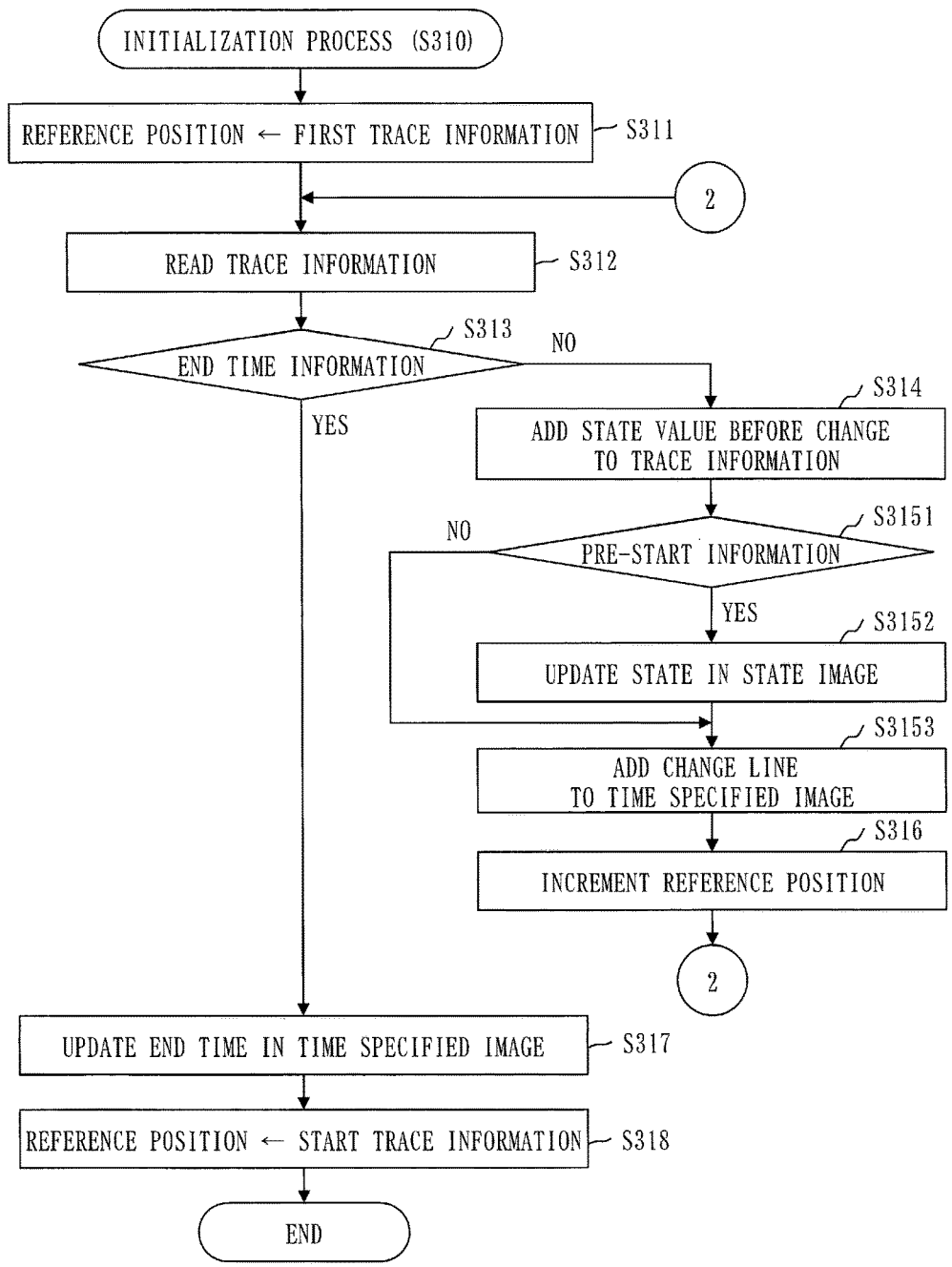
FIG. 11 is a flowchart of an initialization process (S310) in Embodiment 1.

The initialization process (S310) will be described with reference to FIG. 11.

In Step S311, the state management unit 132 selects first trace information from the trace data 210, and sets information indicating a position of the first trace information to a reference position.

The reference position is a variable indicating a position of the trace information to be referred to.

Further, the state management unit 132 sets an initial value of the state to a pre-change variable for each state identifier. The pre-change variable for each state identifier is stored in the storage unit 191. The pre-change variable is a variable in which the state value before the change is set.

In Step S312, the state management unit 132 reads the trace information corresponding to the reference position from the trace data 210.

Steps S313 to S318 are executed with the trace information read out in Step S312 as a target.

In Step S313, the state management unit 132 determines whether the trace information is end time information. The end time information is the trace information including the end time.

Specifically, the state management unit 132 determines whether the end identifier "end" is included in the trace information. The trace information including "end" is the end time information.

When the trace information is the end time information, the process proceeds to Step S317.

When the trace information is not the end time information, the process proceeds to Step S314.

In Step S314, the state management unit 132 adds the state value before the change to the trace information. The state value set in the trace information is the state value after the change.

Specifically, the state management unit 132 operates as follows.

First, the state management unit 132 selects a pre-change variable of the state identifier included in the trace information.

Then, the state management unit 132 extracts the state value before the change from the selected pre-change variable, and adds the state value before the change to the trace information.

Further, the state management unit 132 extracts the state value after the change from the trace information, and updates the value of the selected pre-change variable to the state value after the change.

In Step S3151, the state management unit 132 determines whether the trace information is pre-start information. The pre-start information is the trace information including the pre-start time "−1" as the trace time.

When the trace information is the pre-start information, the process proceeds to Step S3152.

When the trace information is not the pre-start information, the process proceeds to Step S3153.

In step S3152, the image generation unit 133 updates the state in the state image 200 based on the trace information. Then, the display unit 196 displays the updated state image 200.

Specifically, the state image 200 is updated as follows.

First, the state management unit 132 extracts the state identifier and the state value from the trace information.

Next, the image generation unit 133 selects a part corresponding to the state identifier from the state image 200.

Then, the image generation unit 133 updates the selected part to a part indicating a state corresponding to the state value.

In Step S3153, the image generation unit 133 attaches the change line 226 to the state time axis 225 of the time specified image 220. Then, the display unit 196 displays the time specified image 220 after the change line 226 is attached.

Specifically, the image generation unit 133 extracts the change time from the trace information, selects the position corresponding to the change time from the state time axis 225, and attaches the change line 226 to the selected position.

In Step S316, the state management unit 132 increments the reference position.

To increment is to update the reference position to information indicating a position of immediately following trace information.

After Step S316, the process returns to Step S312.

In Step S317, the image generation unit 133 updates the end time included in the time part 221 of the time specified image 220. Then, the display unit 196 displays the updated time specified image 220.

Specifically, the image generation unit 133 updates the end time included in the time part 221 to the end time included in the trace information.

In Step S318, the state management unit 132 selects start trace information from the trace data 210. The start trace information is the first trace information in the trace information including the time other than the pre-start time "−1".

Then, the state management unit 132 sets the information indicating the position of the start trace information to the reference position.

FIG. 12 illustrates an example of the trace data 210 after the initialization process (S310).

In the trace data 210, the state value before the change is added to each trace information.

"0" included in the trace information on the first row, "10" included in the trace information on the second row, and "30" included in the trace information on the third row are the state values before the change.

Figure 13:
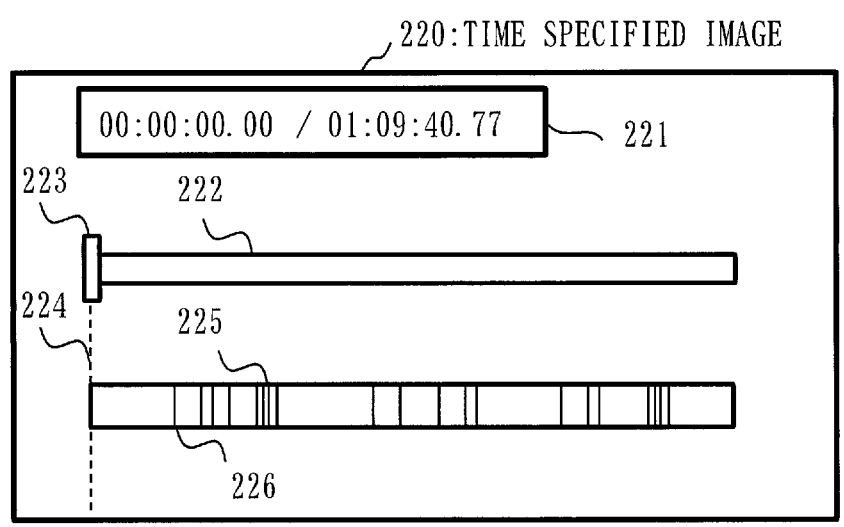
FIG. 13 is a diagram illustrating an example of the time specified image 220 in Embodiment 1.

FIG. 13 illustrates the time specified image 220 after the initialization process (S310).

In the time specified image 220, the last time is set in the time part 221.

Further, the change line 226 for each change time is attached to the state time axis 225.

In order to distinguish between the auxiliary line 224 and the change line 226, the auxiliary line 224 and the change line 226 are different in color from each other.

Returning to FIG. 9, the description will be continued from Step S320.

Step S320 is a reproduction process.

In Step S320, the reproduction unit 130 reproduces the state image 200.

The reproduction process (S320) will be described with reference to FIG. 14.

In the reproduction process (S320), the time control unit 131 updates the reproduction time each time a unit time elapses. Specifically, the time control unit 131 adds the unit time to the reproduction time each time the unit time elapses. The reproduction time is stored in the storage unit 191.

In Step S321, the state management unit 132 reads the trace information corresponding to the reference position from the trace data 210.

Steps S322 to S327 are executed with the trace information read out in Step S321 as the target.

In step S322, when the user wants to operate reproduction of the state image 200, the user operates the input device 907 to input an operation instruction to the simulation reproducing apparatus 100.

When the operation instruction is input, the accepting unit 195 accepts the operation instruction, and the process proceeds to Step S330.

When the operation instruction is not input, the process proceeds to Step S323.

In step S323, the image generation unit 133 updates the reproduction time included in the time part 201 of the state image 200 to a current reproduction time. Then, the display unit 196 displays the updated state image 200.

In Step S324, the state management unit 132 compares the current reproduction time with the trace time.

Specifically, the state management unit 132 extracts the trace time from the trace information, and compares the current reproduction time with the trace time.

When the current reproduction time is the same as the trace time, the process proceeds to Step S325.

When the current reproduction time is a time different from the trace time, the process returns to Step S322.

In Step S325, the state management unit 132 determines whether the trace information is end trace information.

Specifically, the state management unit 132 determines whether the end identifier "end" is included in the trace information.

When the trace information is the end trace information, the process is terminated.

When the trace information is not the end trace information, the process proceeds to Step S326.

In Step S326, the image generation unit 133 updates the state in the state image 200 based on the trace information. An updating method is the same as that in Step S3152. Then, the display unit 196 displays the updated state image 200.

In Step S327, the state management unit 132 increments the reference position.

After Step S327, the process returns to Step S321.

Step S330 is a reproduction control process.

In Step S330, the reproduction unit 130 controls reproduction of the state image 200 according to the accepted operation instruction.

Figure 15:
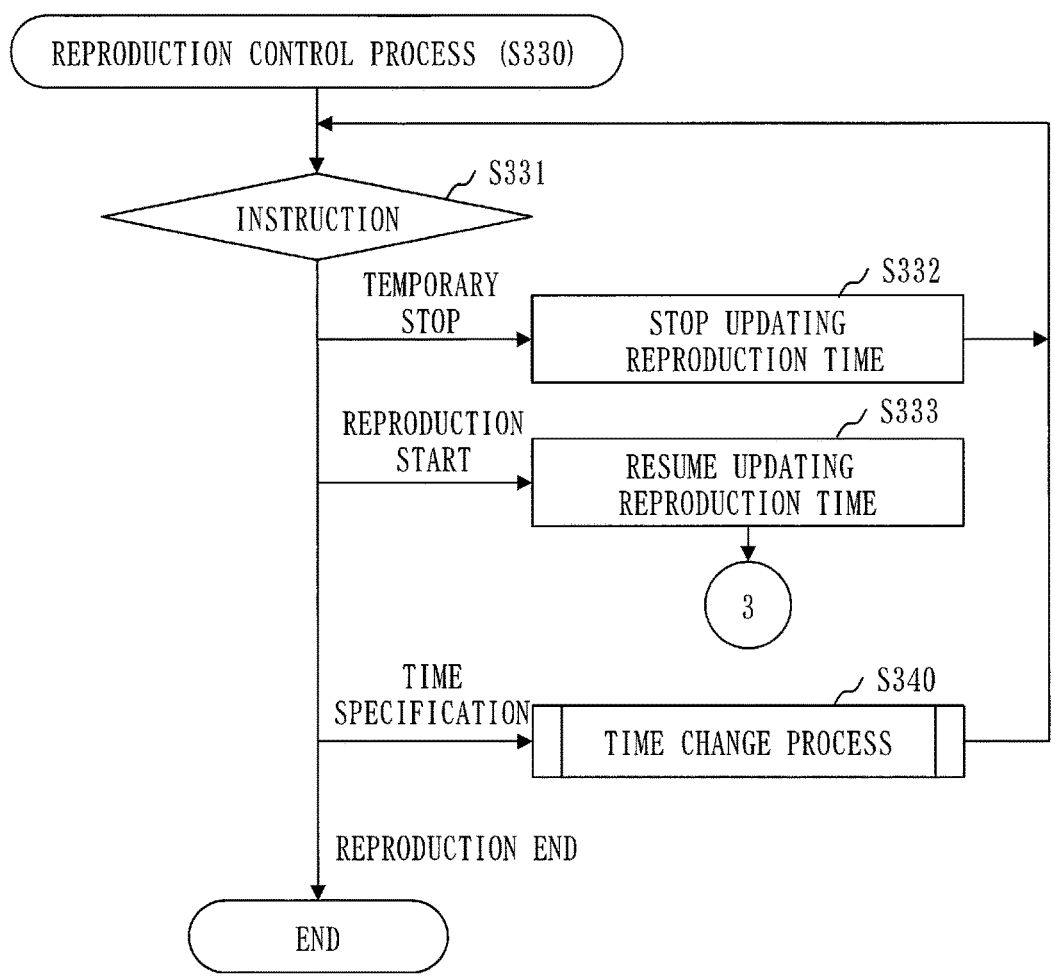
FIG. 15 is a flowchart of a reproduction control process (S330) in Embodiment 1.

The reproduction control process (S330) will be described with reference to FIG. 15.

In Step S331, the acceptance control unit 110 determines the type of the accepted operation instruction.

Specific operation instructions are temporary stop, reproduction start, time specification and reproduction end.

The temporary stop instructs temporary stop of the reproduction. The temporary stop is accepted during the reproduction.

The reproduction start instructs resumption of the reproduction. The reproduction start is accepted during the temporary stop.

The time specification instructs a change of the reproduction time. The time specification is accepted during the temporary stop.

The reproduction end instructs an end of reproduction.

When the operation instruction is the temporary stop, the process proceeds to Step S332.

When the operation instruction is the reproduction start, the process proceeds to Step S333.

When the operation instruction is the time specification, the process proceeds to Step S340.

When the operation instruction is the reproduction end, the process is terminated.

In Step S332, the time control unit 131 stops updating the reproduction time. After Step S332, the process returns to Step S331 to wait until a new operation instruction is accepted.

In Step S333, the time control unit 131 resumes updating the reproduction time.

Figure 14:
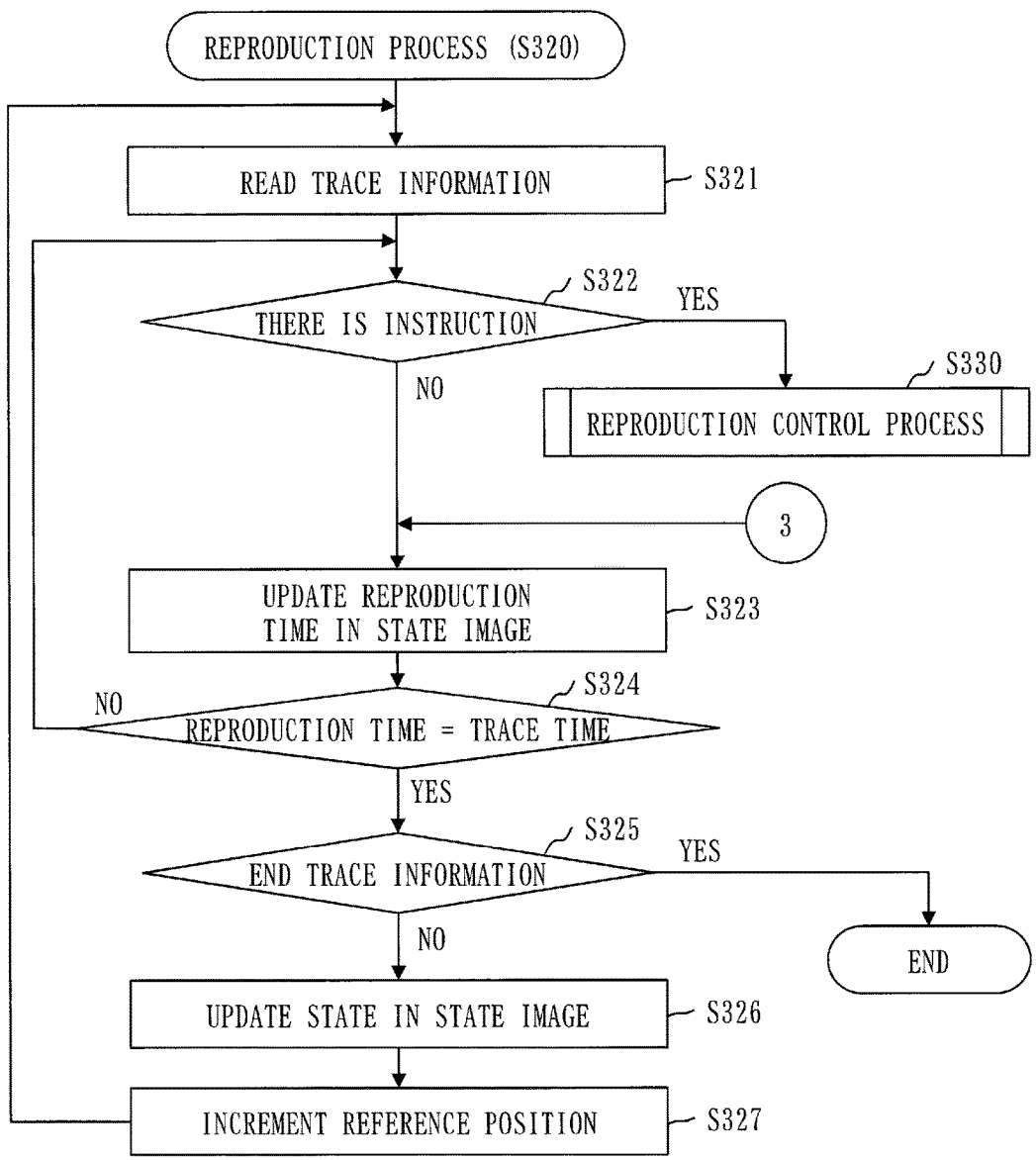
FIG. 14 is a flowchart of a reproduction process (S320) in Embodiment 1.

After Step S333, the process returns to step S323 in FIG. 14.

Step S340 is a time change process.

In Step S340, the reproduction unit 130 changes the reproduction time to a specified time.

After Step S340, the process returns to Step S331 to wait until the new operation instruction is accepted.

The specified time is a time specified by the time specification.

Specifically, the specified time is specified via the time specified image 220.

Figure 16:
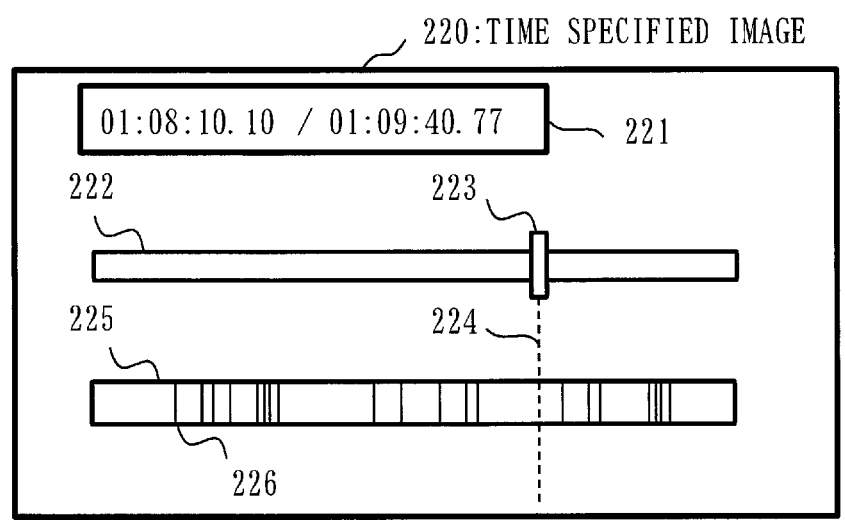
FIG. 16 is a diagram illustrating an example of the time specified image 220 in Embodiment 1.

In FIG. 16, when the user wants to specify the specified time, the user operates the input device 907 to move the knob 223.

When the knob 223 is moved, the image generation unit 133 determines a time corresponding to a position of the knob 223. The determined time is the specified time.

The image generation unit 133 updates the reproduction time included in the time part 221 to the specified time. Then, the display unit 196 displays the updated time specified image 220.

Figure 17:
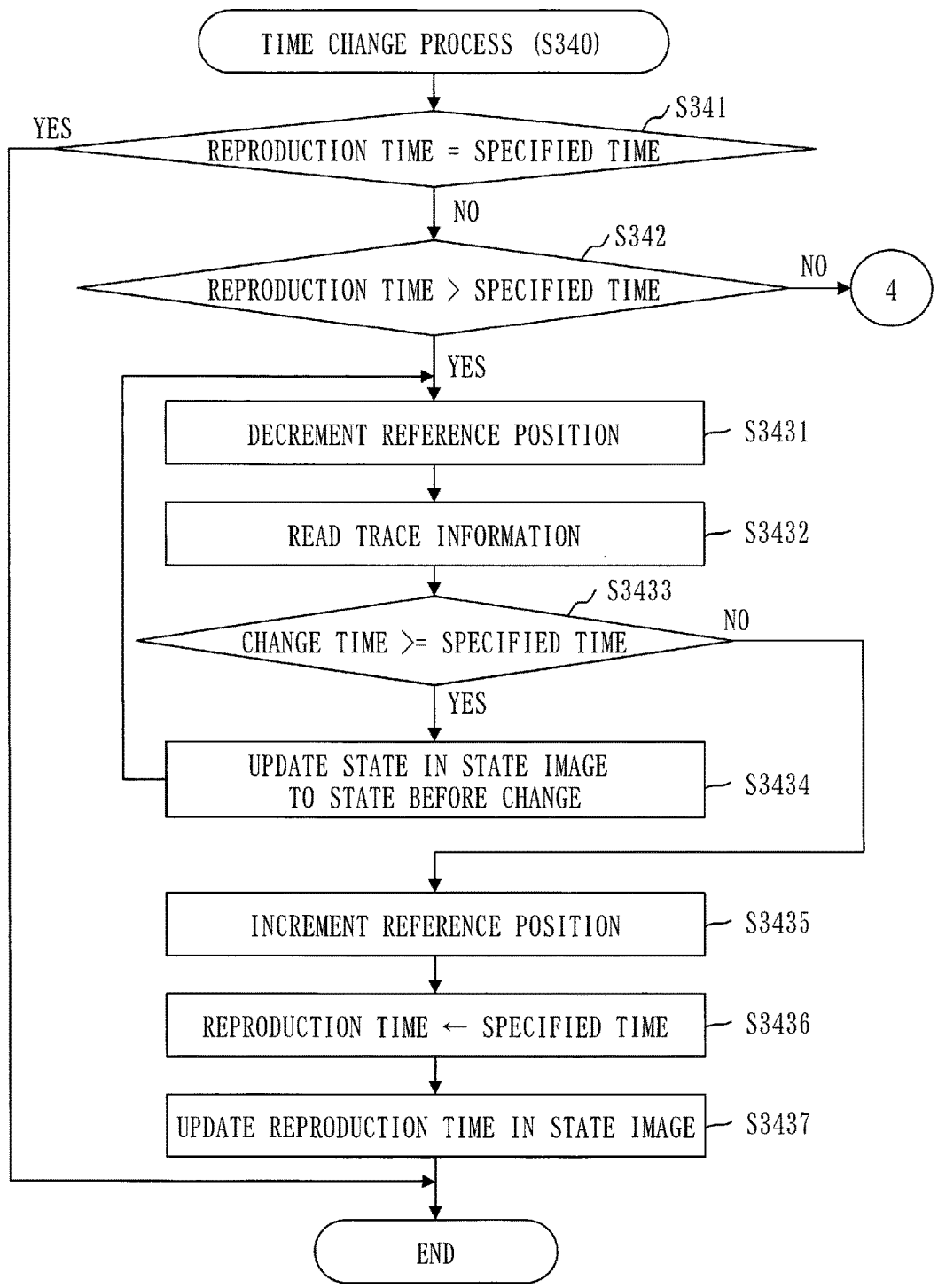
FIG. 17 is a flowchart of a time change process (S340) in Embodiment 1.

The time change process (S340) will be described with reference to FIGS. 17 and 18.

First, Steps S341 to S3437 will be described with reference to FIG. 17.

In Step S341, the state management unit 132 compares the current reproduction time with the specified time.

When the current reproduction time is the same as the specified time, the process is terminated.

When the current reproduction time is a time different from the specified time, the process proceeds to Step S342.

In Step S342, the state management unit 132 determines whether the current reproduction time is a time after the specified time.

When the current reproduction time is a time after the specified time, the process proceeds to Step S3431.

Figure 18:
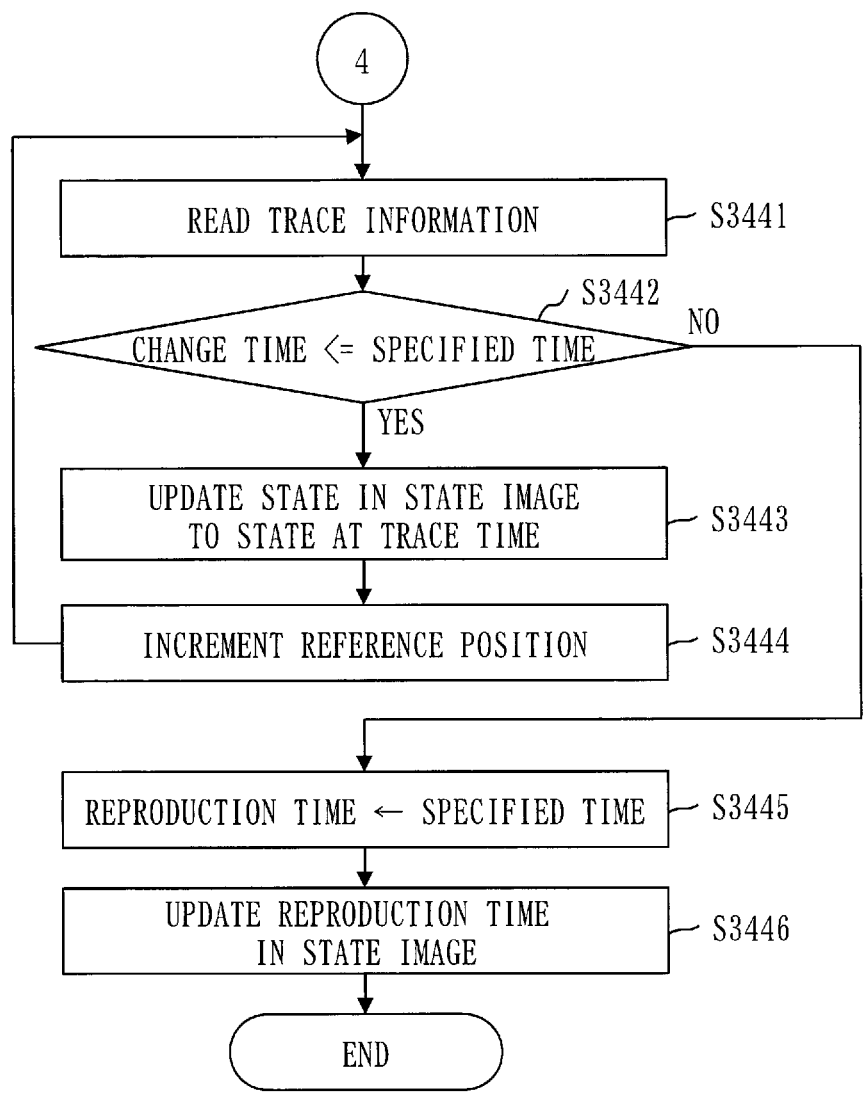
FIG. 18 is a flowchart of the time change process (S340) in Embodiment 1.

When the current reproduction time is a time before the specified time, the process proceeds to Step S3441 in FIG. 18.

In Step S3431, the state management unit 132 decrements the reference position.

To decrement is to update the reference position to the information indicating the position of immediately preceding trace information.

In Step S3432, the state management unit 132 reads the trace information corresponding to the reference position from the trace data 210.

In Step S3433, the state management unit 132 extracts the change time from the trace information, and compares the change time with the specified time.

When the change time is a time after the specified time, the process proceeds to Step S3434.

When the change time is a time before the specified time, the process proceeds to Step S3435.

In Step S3434, the image generation unit 133 updates the state in the state image 200 to the state before the change based on the trace information. Then, the display unit 196 displays the updated state image 200.

Specifically, the state image 200 is updated as follows.

First, the state management unit 132 extracts the state identifier and the state value before the change from the trace information.

Next, the image generation unit 133 selects the part corresponding to the state identifier from the state image 200.

Then, the image generation unit 133 updates the selected part to a part indicating the state corresponding to the state value before the change.

After Step S3434, the process returns to Step S3431.

In Step S3435, the state management unit 132 increments the reference position.

In Step S3436, the time control unit 131 changes the current reproduction time to the specified time.

In Step S3437, the image generation unit 133 updates the reproduction time included in the time part 201 of the state image 200 to the current reproduction time.

Then, the display unit 196 displays the updated state image 200.

Next, Steps S3441 to S3446 will be described with reference to FIG. 18.

In Step S3441, the state management unit 132 reads the trace information corresponding to the reference position from the trace data 210.

In Step S3442, the state management unit 132 extracts the change time from the trace information and compares the change time with the specified time.

When the change time is a time before the specified time, the process proceeds to Step S3443.

When the change time is a time after the specified time, the process proceeds to Step S3445.

In Step S3443, the image generation unit 133 updates the state in the state image 200 to the state at the trace time based on the trace information. Then, the display unit 196 displays the updated state image 200.

Specifically, the state image 200 is updated as follows.

First, the state management unit 132 extracts the state identifier and the state value at the trace time from the trace information. The state value at the trace time is a state value that is not the state value before the change. That is, the state value at the trace time is a state value that is equal to the state identifier in the trace information. The state value at the trace time is also referred to as the state value after the change.

Next, the image generation unit 133 selects a part corresponding to the state identifier from the state image 200.

Then, the image generation unit 133 updates the selected part to a part indicating a state corresponding to the state value at the trace time.

In Step S3444, the state management unit 132 increments the reference position.

After Step S3444, the process returns to Step S3441.

In Step S3445, the time control unit 131 changes the current reproduction time to the specified time.

In Step S3446, the image generation unit 133 updates the reproduction time included in the time part 201 of the state image 200 to the current reproduction time. Then, the display unit 196 displays the updated state image 200.

*Effect of Embodiment 1*

The simulation reproducing apparatus 100 can reproduce and display a simulation result at an arbitrary time in addition to the reproduction and the temporary stop of a reproduction display.

For example, the user can temporarily stop the reproduction in the middle of the reproduction and specify a time one second before, so that the user can check the state one second before without reproducing again from the beginning. Therefore, a check time of the simulation result can be shortened.

Further, the simulation reproducing apparatus 100 can indicate a time when the state has changed on the time axis. As a result, the user can easily select the time to be specified.

*Other Configuration*

The trace data 210 (see FIG. 12) including the state value before the change may be generated by the simulation unit 120.

Embodiment 2

An embodiment of presenting a time satisfying a condition will be described with reference to FIGS. 19 to 24. However, the description repetitive of that in Embodiment 1 will be omitted or simplified.

*Description of Configuration*

As in Embodiment 1, the configuration of the simulation reproducing apparatus 100 includes functional components such as the acceptance control unit 110, the simulation unit 120, and the reproduction unit 130.

The functional configuration of the simulation unit 120 is the same as Embodiment 1.

Figure 19:
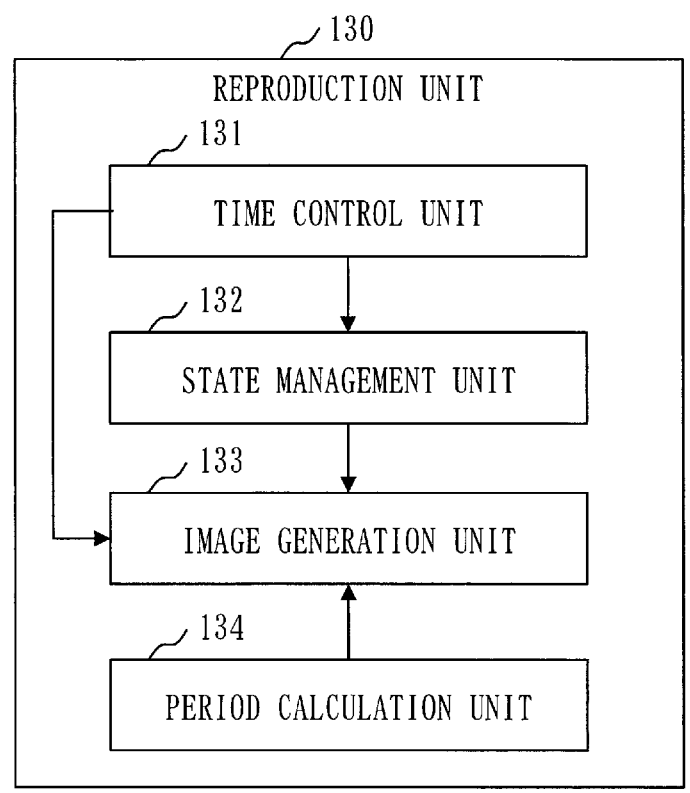
FIG. 19 is a structural diagram of a reproduction unit 130 in Embodiment 2.

The functional configuration of the reproduction unit 130 will be described with reference to FIG. 19.

The reproduction unit 130 includes a period calculation unit 134 in addition to the time control unit 131, the state management unit 132, and the image generation unit 133 described in Embodiment 1. A function of the period calculation unit 134 will be described below.

*Description of Operation*

The procedure of the simulation reproducing method is the same as the procedure described with reference to FIG. 4 in Embodiment 1.

The procedure of the simulation process (S200) is the same as the procedure described with reference to FIG. 5 in Embodiment 1.

The procedure of the reproduction process (S300) is the same as the procedure described with reference to FIG. 9 in Embodiment 1.

However, a part of the reproduction process (S320) is different from that of Embodiment 1.

Steps S321 to S327 of the reproduction process (S320) are the same as the process described with reference to FIG. 14 in Embodiment 1.

However, a part of the reproduction control process (S330) is different from that in Embodiment 1.

Figure 20:
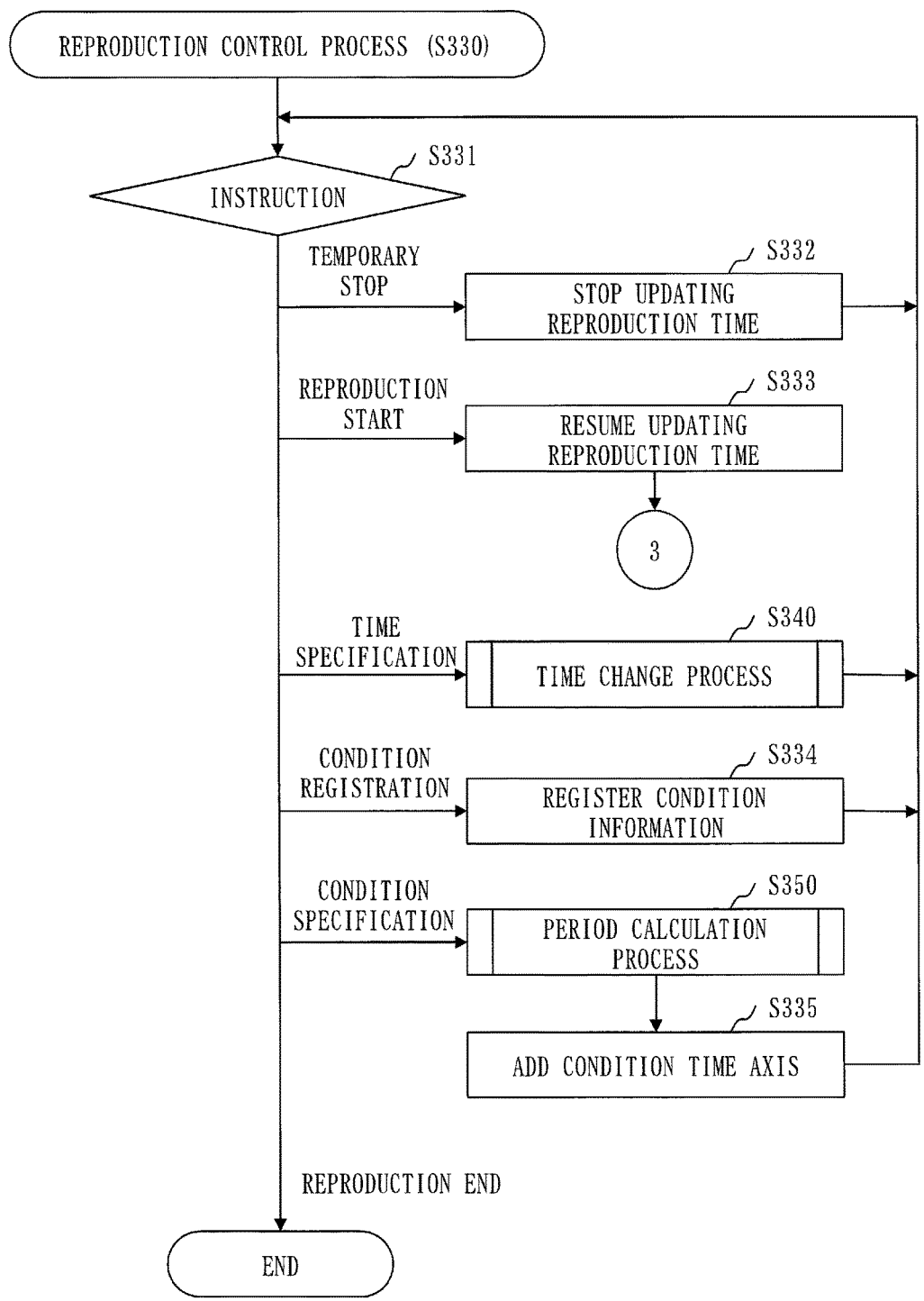
FIG. 20 is a flowchart of a reproduction control process (S330) in Embodiment 2.

The reproduction control process (S330) will be described with reference to FIG. 20.

In Step S331, the acceptance control unit 110 determines the type of the accepted operation instruction.

To the operation instruction in Embodiment 1, condition registration and condition specification are added.

The condition registration instructs registration of the condition information to condition data 230. The condition registration is accepted during the temporary stop. The condition data 230 and the condition information will be described below.

The condition specification instructs addition of a condition time axis 227 to the time specified image 220. The condition time axis 227 will be described below.

When the operation instruction is the condition registration, the process proceeds to Step S334.

When the operation instruction is the condition specification, the process proceeds to Step S350.

The condition data 230 will be described with reference to FIG. 21.

The condition data 230 includes one or more condition information. A first row in the drawing corresponds to the condition information.

The condition information includes a condition identifier and a conditional expression.

The condition identifier identifies the conditional expression.

The conditional expression includes a state identifier, an operator and a condition value, and indicates a condition on the state value.

Figure 22:
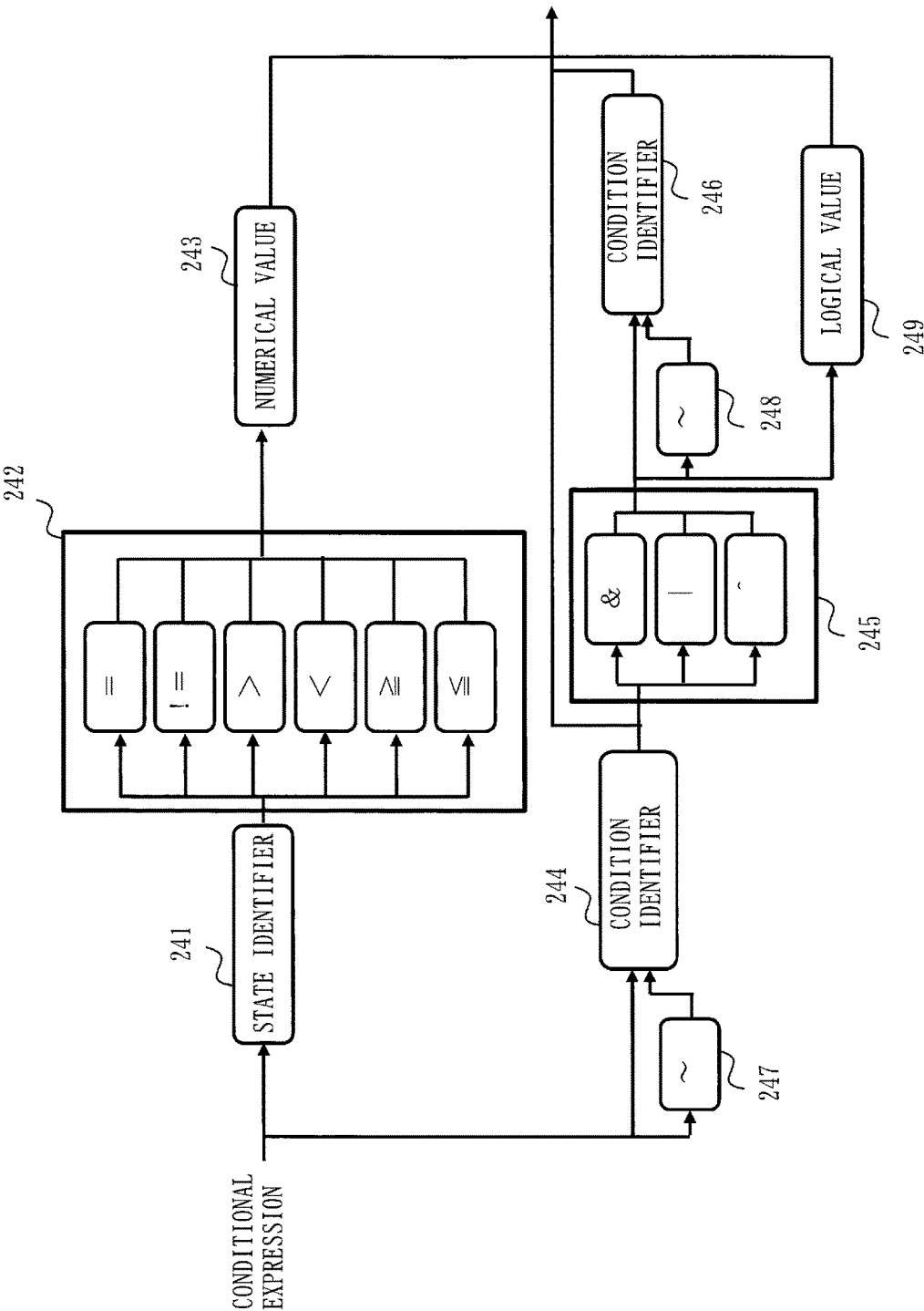
FIG. 22 is a structural diagram of a conditional expression in Embodiment 2.

The configuration of the conditional expression will be described with reference to FIG. 22.

The conditional expression includes elements such as a state identifier 241, a comparison operator 242, and a numerical value 243.

Alternatively, the conditional expression includes elements such as a negation operator 247, a condition identifier 244, a logical operator 245, a negation operator 248, a condition identifier 246, and a logical value 249.

These elements are separated by blanks of arbitrary length.

The condition identifier 244 and the condition identifier 246 represent a condition that is true when the conditional expression corresponding to the condition identifier is established and is false when the conditional expression is not established.

The negation operator 247 represents a negation of the conditional expression corresponding to the condition identifier 244. The negation operator 248 represents the negation of the conditional expression corresponding to the condition identifier 246.

The logical value 249 is a true or false value.

When the conditional expression includes the condition identifier, it is assumed that the conditional expression corresponding to the condition identifier is registered in the condition data 230 before the conditional expression.

Figure 23:
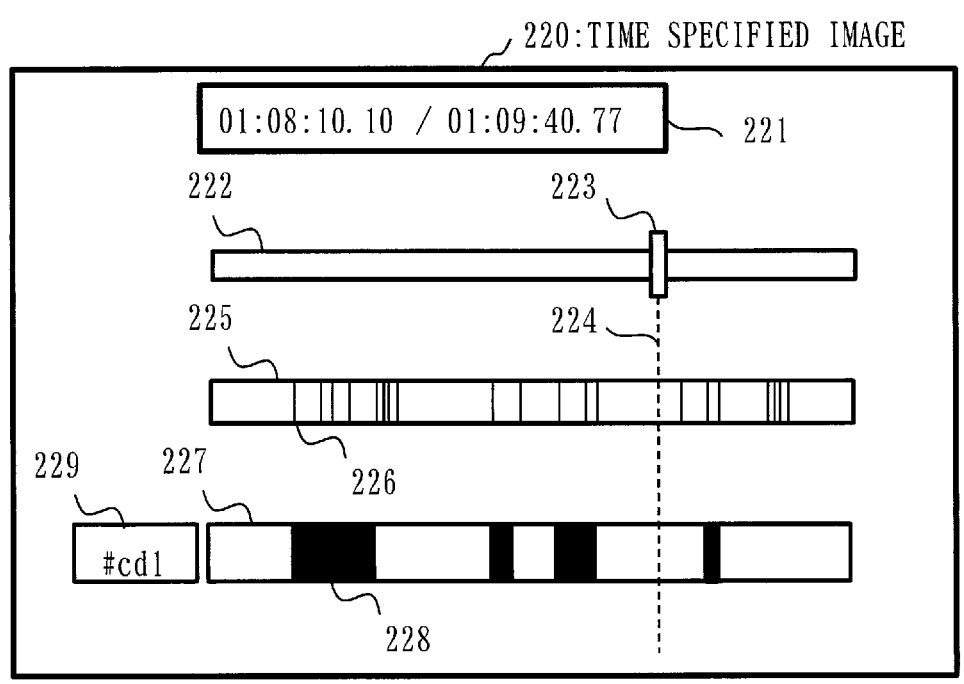
FIG. 23 is a diagram illustrating an example of a time specified image 220 in Embodiment 2.

The time specified image 220 will be described with reference to FIG. 23.

The time specified image 220 includes one or more sets of the condition time axis 227 and a condition identifier 229.

The condition time axis 227 is a part indicating the time axis corresponding to the simulation period, and is arranged in parallel with the specified time axis 222 and the state time axis 225. A left end of the condition time axis 227 corresponds to the start time of the simulation, and a right end of the condition time axis 227 corresponds to the end time of the simulation.

A condition establishment period 228 is written on the condition time axis 227. Black portions in the drawing indicate the condition establishment period 228.

The condition establishment period 228 is a period in which the conditional expression identified by the condition identifier 229 is established.

The auxiliary line 224 moves along the state time axis 225 and the condition time axis 227 in conjunction with the knob 223.

Returning to FIG. 20, Step S334 will be described.

In Step S334, the acceptance control unit 110 registers the condition information in the condition data 230. Note that the condition information is accepted together with the condition registration.

After Step S334, the process returns to Step S331 to wait until a new operation instruction is accepted.

Next, Step S350 will be described.

Step S350 is a period calculation process.

In Step S350, the period calculation unit 134 calculates the condition establishment period and generates a period list indicating the condition establishment period. The period list is stored in the storage unit 191.

The condition establishment period is a period in which the conditional expression is established. The conditional expression is identified by the condition identifier. The condition identifier is included in condition specification information. The condition specification information is accepted together with the condition specification.

The period calculation process (S350) will be described in detail later.

In Step S335, the image generation unit 133 adds the condition time axis 227 indicating the condition establishment period to the time specified image 220 using the period list. Then, the display unit 196 displays the time specified image 220 including the condition time axis 227.

After Step S335, the process returns to Step S331 to wait until a new operation instruction is accepted.

Figure 24:
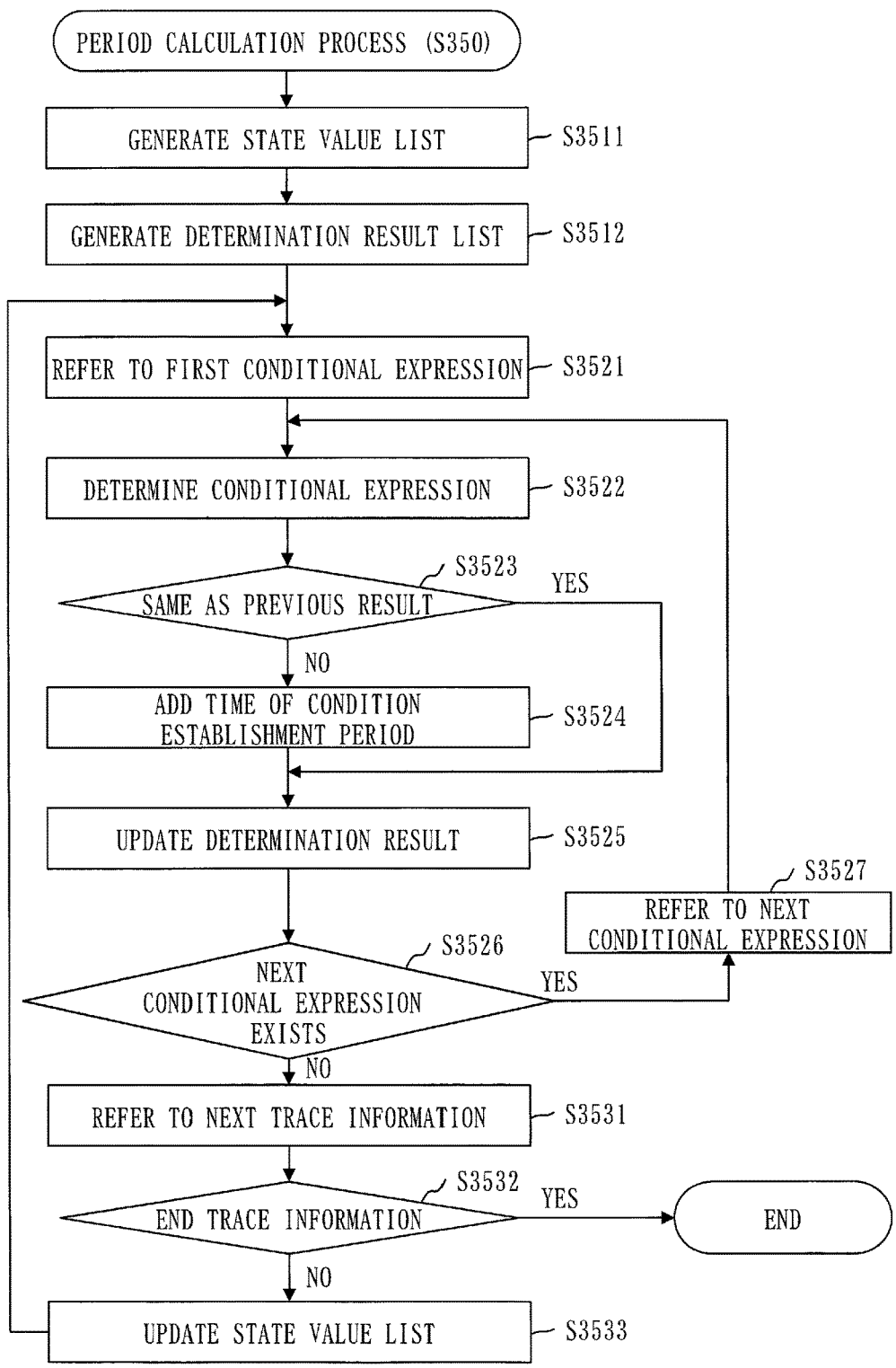
FIG. 24 is a flowchart of a period calculation process (S350) in Embodiment 2.

The period calculation process (S350) will be described with reference to FIG. 24.

In the period calculation process (S350), a reference position different from the reference position used in other than the period calculation process (S350) is used.

In Step S3511, the period calculation unit 134 generates a state value list using the trace data 210. The state value list is a list indicating the state values for each state identifier before starting the simulation and is stored in the storage unit 191.

Specifically, the period calculation unit 134 operates as follows.

First, the period calculation unit 134 reads one piece of trace information including the pre-start time "−1" in order.

Next, the period calculation unit 134 extracts the state identifier and the state value from the read trace information.

Next, the period calculation unit 134 determines whether the state identifier the same as the extracted state identifier is registered in the state value list.

When the state identifier is registered in the state value list, the period calculation unit 134 updates the state value corresponding to the state identifier to the extracted state value.

When the state identifier is not registered in the state value list, the period calculation unit 134 adds a set of the extracted state identifier and state value to the state value list.

Reading of the trace information is performed using the reference position.

After Step S3512, the reference position indicates the start trace information.

In Step S3512, the period calculation unit 134 generates a determination result list in the initial state.

The determination result list is a list indicating the determination result for each condition identifier, and is stored in the storage unit 191. The determination result is an establishment value or a non-establishment value. The establishment value indicates that the conditional expression identified by the condition identifier is established. The non-establishment value indicates that the conditional expression identified by the condition identifier is not established.

Specifically, the period calculation unit 134 extracts the condition identifier from the condition specification information. Then, the period calculation unit 134 registers a set of the condition identifier and the non-establishment value in the determination result list for each extracted condition identifier.

In Step S3521, the period calculation unit 134 refers to a first conditional expression.

Specifically, the period calculation unit 134 selects a first condition identifier from the condition specification information, and reads the conditional expression corresponding to the same condition identifier as the first condition identifier from the condition data 230.

In Step S3522, the period calculation unit 134 determines whether the conditional expression is established.

When the left side of the conditional expression is the state identifier, the period calculation unit 134 reads the state value corresponding to the state identifier from the state value list and compares the state value with the value on the right side of the conditional expression. Then, the period calculation unit 134 determines whether the conditional expression is established based on the comparison result.

When the left side of the conditional expression is the condition identifier, the period calculation unit 134 reads the determination result corresponding to the condition identifier from the determination result list. Then, the period calculation unit 134 determines whether the conditional expression is established based on the read determination result.

In Step S3523, the period calculation unit 134 compares the current determination result with the previous determination result.

Specifically, the period calculation unit 134 reads the determination result corresponding to the conditional expression referred to in Step S3521 or Step S3527 from the determination result list. The determination result to be read is the previous determination result. Then, the period calculation unit 134 compares the current determination result obtained in Step S3522 with the previous determination result.

When the current determination result is the same as the previous determination result, the process proceeds to Step S3525.

When the current determination result is different from the previous determination result, the process proceeds to Step S3524.

In Step S3524, the period calculation unit 134 adds the start time or the end time of the condition establishment period to the period list.

Specifically, the period calculation unit 134 operates as follows.

First, the period calculation unit 134 extracts the change time from the trace information corresponding to the reference position.

Then, the period calculation unit 134 adds a set of the condition identifier, the change time, and the current determination result to the period list.

When the current determination result is the establishment value, the change time is the start time. When the current determination result is the non-establishment value, the change time is the end time.

In Step S3525, the period calculation unit 134 updates the previous determination result included in the determination result list to the current determination result.

In Step S3526, the period calculation unit 134 determines whether a next conditional expression exists.

Specifically, the period calculation unit 134 determines whether a next condition identifier exists in the condition specification information. When there is the next condition identifier, there is the next conditional expression.

When there is the next conditional expression, the process proceeds to Step S3527.

When there is not the next conditional expression, the process proceeds to Step S3531.

In Step S3527, the period calculation unit 134 refers to the next conditional expression.

Specifically, the period calculation unit 134 selects the next condition identifier from the condition specification information and reads the conditional expression corresponding to the same condition identifier as the next condition identifier from the condition data 230.

After Step S3527, the process returns to Step S3522.

In Step S3531, the period calculation unit 134 refers to the next trace information.

Specifically, the period calculation unit 134 increments the reference position and reads the trace information corresponding to the reference position from the trace data 210.

In Step S3532, the period calculation unit 134 determines whether the read trace information is the end trace information.

Specifically, the period calculation unit 134 determines whether the read trace information includes the end identifier "end".

When the read trace information is the end trace information, the process is terminated.

When the read trace information is not the end trace information, the process proceeds to Step S3533.

In step S3533, the period calculation unit 134 updates the state value list.

Specifically, the period calculation unit 134 updates the state value list as follows.

First, the period calculation unit 134 extracts the state identifier and the state value from the read trace information.

Next, the period calculation unit 134 selects the same state identifier as the extracted state identifier from the state value list.

Then, the period calculation unit 134 updates the state value corresponding to the selected state identifier to the extracted state value.

\*\*\*Effect of Embodiment 2\*\*\*

The simulation reproducing apparatus 100 can indicate the period in which the condition is established on the time axis. As a result, check efficiency of the simulation result is improved.

The user can specify another conditional expression in the conditional expression. Therefore, the user can specify a combination of conditional expressions.

Embodiment 3

Figure 26:
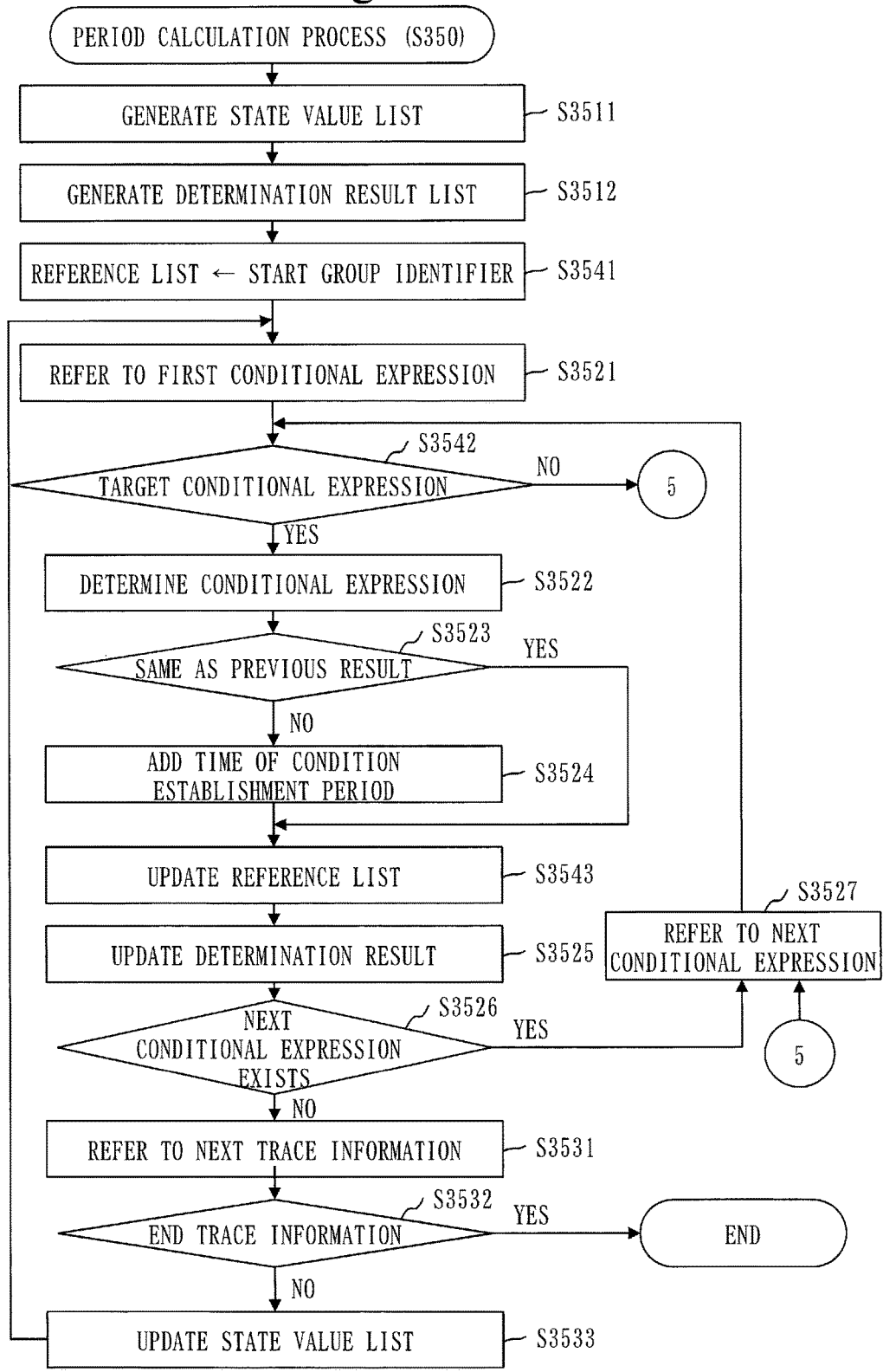
FIG. 26 is a flowchart of a period calculation process (S350) in Embodiment 3.

An embodiment in which the conditional expression is switched when the conditional expression is established will be described with reference to FIGS. 25 to 26. However, description repetitive of that in Embodiment 1 or Embodiment 2 will be omitted or simplified.

*Description of Configuration*

The configuration of the simulation reproducing apparatus 100 is the same as that of Embodiment 2.

*Description of Operation*

The simulation reproducing method is the same as that of Embodiment 2 except for the period calculation process (S350). The period calculation process (S350) is partially different from that of Embodiment 2.

The condition data 230 used in the period calculation process (S350) is partially different from that of Embodiment 2.

The condition data 230 will be described with reference to FIG. 25.

The condition data 230 includes one or more condition groups.

The condition group includes a group identifier and one or more condition information.

The group identifier identifies the condition group. "$Lx" prefixed to a bracket { } is the group identifier.

The condition group identified by the group identifier attached with a start identifier "*" is called a start group. The start group is the condition group to be referred to first. There may be plural start groups.

Each row in the bracket { } is the condition information.

The condition information includes a condition identifier, a conditional expression, an operation identifier, and a group identifier.

The operation identifier identifies the operation. The operation identifier "go" identifies the operation by which a reference group is switched when the conditional expression is established. The reference group is the condition group to be referred to. When the conditional expression is established, the reference group is switched to the condition group identified by the group identifier. There may be plural reference groups.

When the reference group is the condition group $L1 and the conditional expression "led 1=1" is established, the reference group is switched to the condition group $L2.

When the reference group is the condition group $L1 and the conditional expression "sw1=1" is established, the reference group is switched to the condition group $L3.

When the reference group is the condition group $L2 and the conditional expression "led 1=0" is established, the reference group is switched to the condition group $L1.

When the reference group is the condition group $L3 and the conditional expression "sns1>24" is established, the reference group is switched to the condition group $L1.

The condition information outside the bracket { } is the condition information not belonging to any condition group.

That is, the conditional expression "sns1<5" identified by the condition identifier "#cd5" does not belong to any condition group of $L1 to $L3. A column indicating the operation identifier and the group identifier is blank.

The period calculation process (S350) will be described with reference to FIG. 26.

Steps S3511 and S3512 are the same as those in Embodiment 2.

After Step S3512, the process proceeds to Step S3541.

In Step S3541, the period calculation unit 134 sets a start group identifier in the reference list.

The reference list indicates the group identifier of the condition group to be referred to.

The start group identifier is the group identifier of the start group. There may be plural start group identifiers.

Specifically, the period calculation unit 134 selects the group identifier attached with the start identifier "*" from the condition data 230. The selected group identifier is the start group identifier. Then, the period calculation unit 134 sets the selected start group identifier in the reference list.

After Step S3541, the process proceeds to Step S3521.

Step S3521 is the same as that in Embodiment 2.

After Step S3521, the process proceeds to Step S3542.

In Step S3542, the period calculation unit 134 determines whether the conditional expression referred to in Step S3521 or Step S3527 is a target conditional expression.

The target conditional expression is a conditional expression not belonging to the condition group or a conditional expression included in the reference group.

Specifically, the period calculation unit 134 conducts determination as follows.

The period calculation unit 134 determines whether the conditional expression referred to in Step S3521 or Step S3527 belongs to the condition group.

When the referred conditional expression does not belong to the condition group, the period calculation unit 134 determines that the referred conditional expression is the target conditional expression.

When the referred conditional expression belongs to the condition group, the period calculation unit 134 compares the group identifier corresponding to the referred conditional expression with a reference group identifier. The group identifier corresponding to the referred conditional expression is the group identifier of the condition group to which the referred conditional expression belongs. The reference group identifier is the group identifier set in the reference list. There may be plural reference group identifiers.

When the group identifier corresponding to the referred conditional expression is the same group identifier as the reference group identifier, the period calculation unit 134 determines that the referred conditional expression is the target conditional expression.

When the group identifier corresponding to the referred conditional expression is not the same group identifier as the reference group identifier, the period calculation unit 134 determines that the referred conditional expression is not the target conditional expression.

When the referred conditional expression is the target conditional expression, the process proceeds to Step S3522.

When the referred conditional expression is not the target conditional expression, the process proceeds to Step S3527.

Steps S3522 to S3524 are the same as those in Embodiment 2.

After Step S3524, the process proceeds to Step S3543.

In step S3543, the period calculation unit 134 updates the reference list.

Specifically, the period calculation unit 134 operates as follows.

The period calculation unit 134 determines whether the conditional expression determined in Step S3522 belongs to the condition group.

When the determined conditional expression belongs to the condition group, the period calculation unit 134 determines whether the current determination result is the establishment value.

When the current determination result is the establishment value, the period calculation unit 134 selects the condition information including the determined conditional expression from the condition data 230. Then, the period calculation unit 134 determines whether the operation identifier "go" is included in the selected condition information.

When the selected condition information includes the operation identifier "go", the period calculation unit 134 extracts the group identifier from the selected condition information. Then, the period calculation unit 134 updates the group identifier set in the reference list to the extracted group identifier.

After Step S3543, the process proceeds to Step S3525.

Steps S3525 to S3527 and Steps S3531 to S3533 are the same as those in Embodiment 2.

*Effect of Embodiment 3*

The simulation reproducing apparatus 100 can switch the condition group to be determined. Therefore, the user can specify a combination of time series conditions. That is, the user can specify more complicated conditions.

Embodiment 4

An embodiment in which a method of advancing the reproduction time is switched when the conditional expression is established will be described with reference to FIGS. 27 to 31. However, description repetitive of that in Embodiments 1 to 3 will be omitted or simplified.

*Description of Configuration*

The configuration of the simulation reproducing apparatus 100 is the same as that of Embodiment 3.

*Description of Operation*

The simulation reproducing method is the same as that of Embodiment 3 except for the reproduction process (S320) and the period calculation process (S350).

The reproduction process (S320) and the period calculation process (S350) are partially different from those of Embodiment 3.

Further, the condition data 230 used in the period calculation process (S350) is partially different from that of Embodiment 3.

The condition data 230 will be described with reference to FIG. 27.

In the condition data 230, at least one of the condition information includes time control information.

The time control information is information for specifying the method of advancing the reproduction time.

Specific time control information is temporary stop information or speed change information.

The temporary stop information is information for specifying the temporary stop of the reproduction. A specific temporary stop information is an operation identifier "pause".

The speed change information is information for specifying change in a reproduction speed. A specific speed change information is "spd=x". "spd" is the operation identifier. "x" is the reproduction speed.

"spd=2" means double speed. That is, the reproduction is performed at twice the normal speed.

"spd=0.7" means 0.7 times speed. That is, the reproduction is performed at 0.7 times the normal speed.

Figure 28:
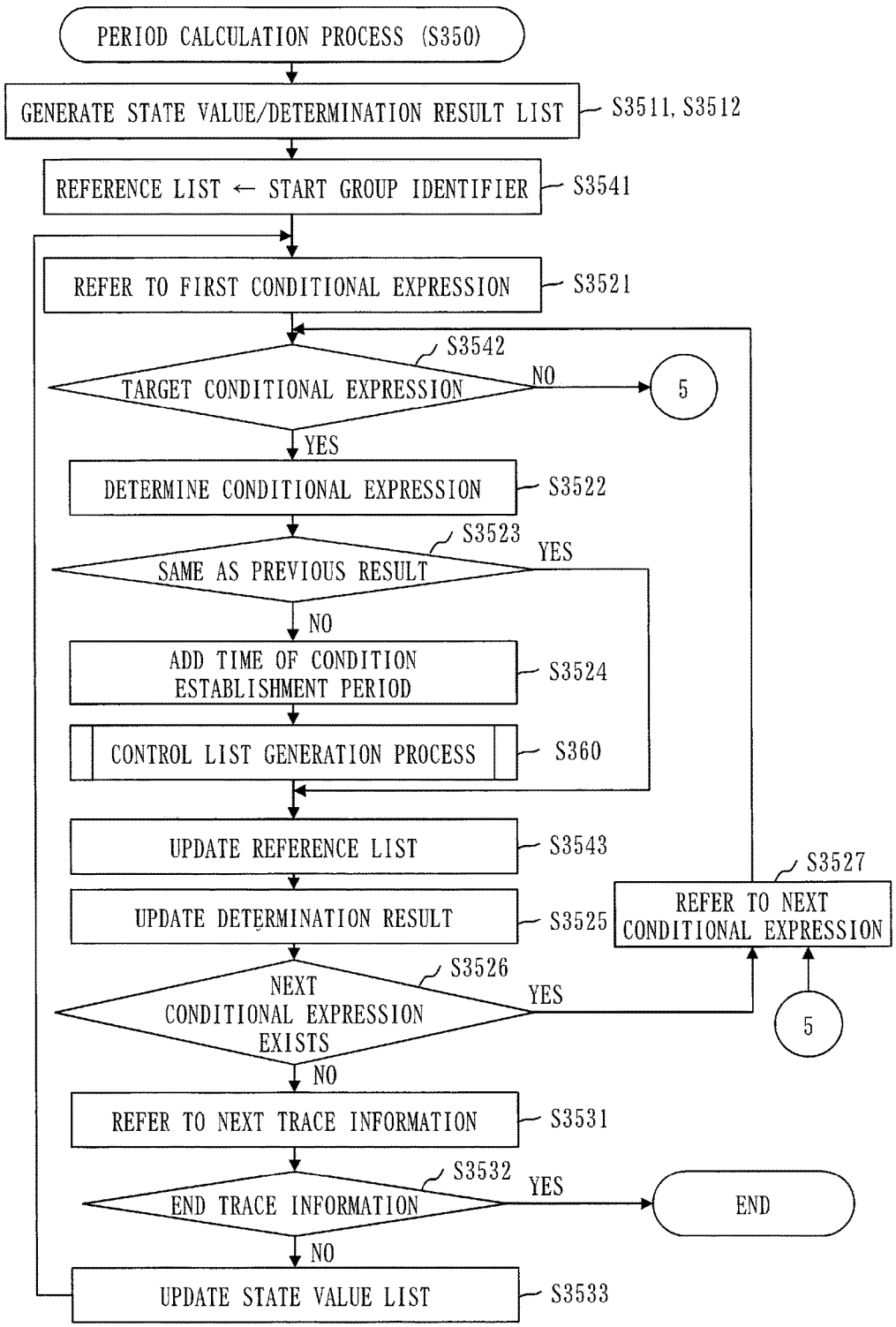
FIG. 28 is a flowchart of a period calculation process (S350) in Embodiment 4.

The period calculation process (S350) will be described with reference to FIG. 28.

Steps S3511 to S3524 are the same as those in Embodiment 3.

After Step S3524, the process proceeds to Step S360.

Step S360 is a control list generation process.

In Step S360, the period calculation unit 134 generates a control list.

A specific control list is a temporary stop list and a speed change list.

The temporary stop list is a list of times at which the reproduction is temporarily stopped and is stored in the storage unit 191.

The speed change list is a list of times at which the reproduction speed is changed and is stored in the storage unit 191.

The control list generation process (S360) will be described in detail later.

After Step S360, the process proceeds to Step S3543.

Step S3543, Step S3525 to Step S3527, and Steps S3531 to S3533 are the same as those in Embodiment 3.

Figure 29:
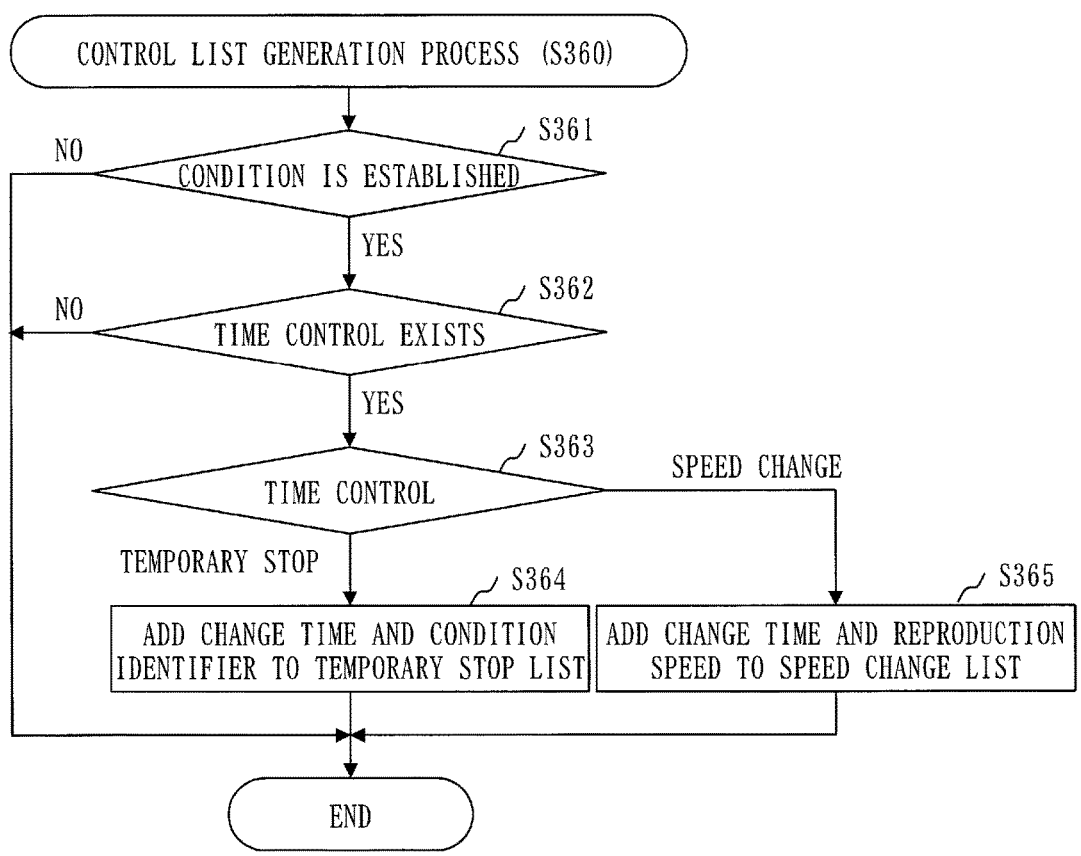
FIG. 29 is a flowchart of a control list generation process (S360) in Embodiment 4.

The control list generation process (S360) will be described with reference to FIG. 29.

In Step S361, the period calculation unit 134 determines whether the conditional expression is established.

Specifically, the period calculation unit 134 determines whether the current determination result is the establishment value.

When the conditional expression is established, the process proceeds to Step S362.

When the conditional expression is not established, the process is terminated.

In Step S362, the period calculation unit 134 determines whether there is the time control information corresponding to the conditional expression.

Specifically, the period calculation unit 134 reads the condition information including the target conditional expression from the condition data 230. Then, the period calculation unit 134 determines whether the time control information is included in the read condition information.

When there is the time control information corresponding to the conditional expression, the process proceeds to Step S363.

When there is not the time control information corresponding to the conditional expression, the process is terminated.

In Step S363, the period calculation unit 134 determines whether the time control information corresponding to the conditional expression is one of the temporary stop information and the speed change information.

When the time control information corresponding to the conditional expression is the temporary stop information, the process proceeds to Step S364.

When the time control information corresponding to the conditional expression is the speed change information, the process proceeds to Step S365.

In step S364, the period calculation unit 134 adds a set of the change time and the condition identifier to the temporary stop list.

Specifically, the period calculation unit 134 reads the trace information corresponding to the reference position from the trace data 210 and extracts the change time from the read trace information. Further, the period calculation unit 134 extracts the condition identifier corresponding to the temporary stop information from the condition information. Then, the period calculation unit 134 adds the set of the extracted change time and the extracted condition identifier to the temporary stop list.

In Step S365, the period calculation unit 134 adds a set of the change time and the reproduction speed to the speed change list.

Specifically, the period calculation unit 134 reads the trace information corresponding to the reference position from the trace data 210 and extracts the change time from the read trace information. Further, the period calculation unit 134 extracts the reproduction speed from the speed change information. Then, the period calculation unit 134 adds the set of the extracted change time and the extracted reproduction speed to the speed change list.

Figure 30:
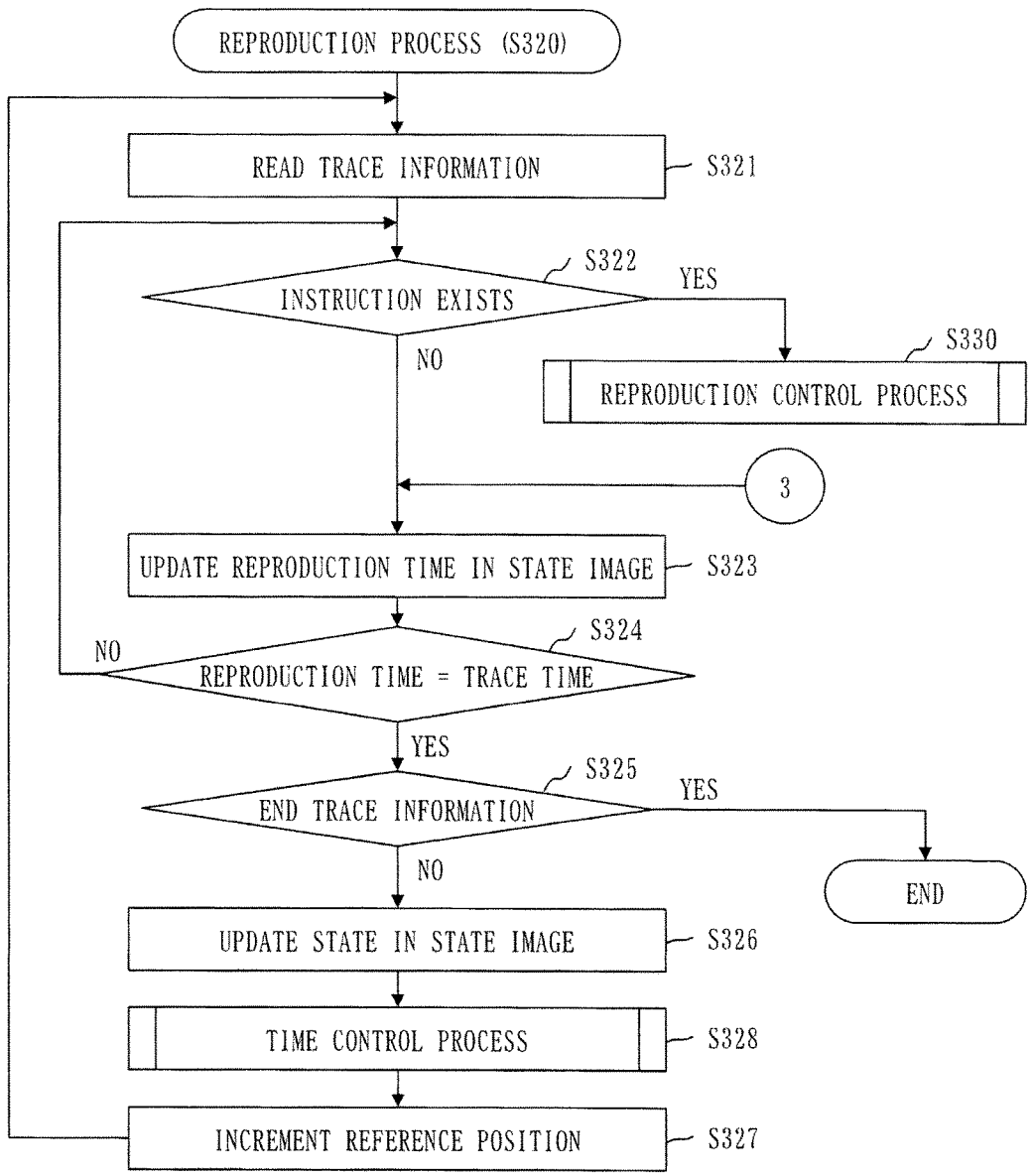
FIG. 30 is a flowchart of a reproduction process (S320) in Embodiment 4.

The reproduction process (S320) will be described with reference to FIG. 30.

Steps S321 to S326 are the same as those in Embodiment 1.

After Step S326, the process proceeds to Step S328.

Step S328 is a time control process.

In Step S328, the time control unit 131 controls the method of advancing the reproduction time based on the time control list.

The time control process (S328) will be described in detail later.

After Step S328, the process proceeds to Step S327.

Step S327 is the same as that of Embodiment 1.

Figure 31:
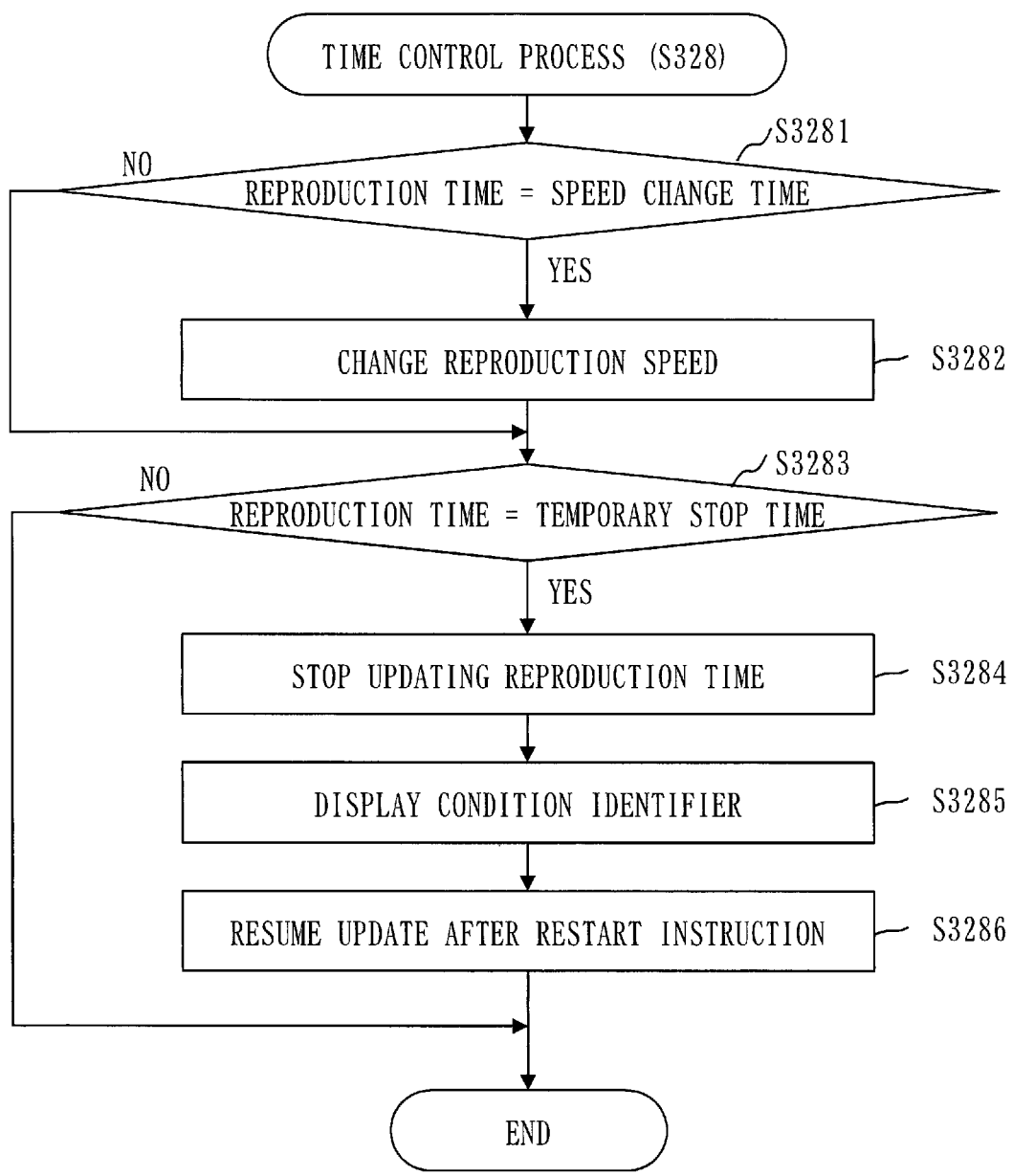
FIG. 31 is a flowchart of a time control process (S328) in Embodiment 4.

The time control process (S328) will be described with reference to FIG. 31.

In Step S3281, the time control unit 131 determines whether the current reproduction time is the speed change time.

The speed change time is the time included in the speed change list.

When the current reproduction time is the speed change time, the process proceeds to Step S3282.

When the current reproduction time is not the speed change time, the process proceeds to Step S3283.

In Step S3282, the time control unit 131 changes the reproduction speed.

Specifically, the time control unit 131 extracts the change speed corresponding to the speed change time from the speed change list. Thereafter, the time control unit 131 advances the reproduction time at the extracted reproduction speed.

Specifically, the time control unit 131 advances the reproduction time as follows.

When the reproduction speed is double speed, the time control unit 131 adds twice the unit time to the reproduction time each time the unit time elapses.

When the reproduction speed is 0.7 times speed, the time control unit 131 adds 0.7 times the unit time to the reproduction time each time the unit time passes.

In Step S3283, the time control unit 131 determines whether the current reproduction time is the temporary stop time.

The temporary stop time is the time included in the temporary stop list.

When the current reproduction time is the temporary stop time, the process proceeds to Step S3284.

When the current reproduction time is not the temporary stop time, the process is terminated.

In Step S3284, the time control unit 131 stops updating the reproduction time.

In Step S3285, the time control unit 131 extracts the condition identifier corresponding to the temporary stop time from the temporary stop list.

The image generation unit 133 generates an identifier image indicating the condition identifier. Then, the display unit 196 displays the identifier image.

In step S3286, the time control unit 131 waits until a restart instruction is accepted. Then, after the restart instruction is accepted, the time control unit 131 resumes updating the reproduction time.

After Step S3286, the process is terminated.

\*\*\*Effect of Embodiment 4\*\*\*

The simulation reproducing apparatus 100 can temporary stop the reproduction display when the condition is established. Therefore, by setting the error condition, the user can temporarily stop the reproduction display when an error occurs.

The simulation reproducing apparatus 100 can change the reproduction speed when the condition is established. Therefore, by setting an error condition, the user can slow down the reproduction speed after the error occurs. Further, by setting a normal condition, the user can increase the reproduction speed until the error occurs.

\*\*\*Supplement to Embodiment\*\*\*

In Embodiments, a function of the simulation reproducing apparatus 100 may be realized by hardware.

Figure 32:
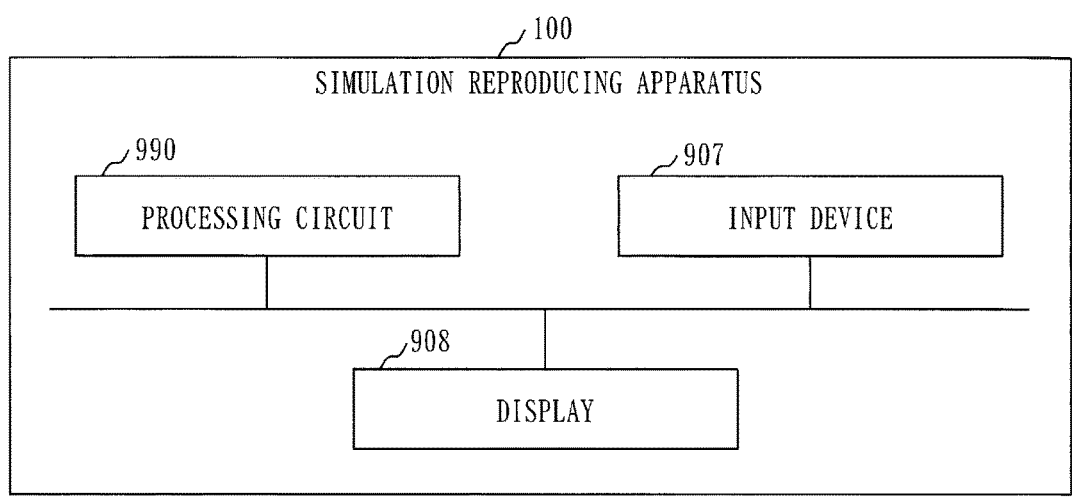
FIG. 32 is a hardware structural diagram of a simulation reproducing apparatus 100 in Embodiments.

FIG. 32 illustrates a structure when the function of the simulation reproducing apparatus 100 is realized by hardware.

The simulation reproducing apparatus 100 includes a processing circuit 990. The processing circuit 990 is also referred to as a processing circuitry.

The processing circuit 990 is a dedicated electronic circuit for realizing the function of the "units" described in Embodiments. The "units" also include the storage unit 191.

Specifically, the processing circuit 990 is a single circuit, a composite circuit, a programmed processor, a parallel programmed processor, a logic IC, a GA, an ASIC, an FPGA, or a combination thereof. GA is an abbreviation of Gate Array, ASIC is an abbreviation of Application Specific Integrated Circuit, and FPGA is an abbreviation of Field Programmable Gate Array.

It should be noted that the simulation reproducing apparatus 100 may include a plurality of processing circuits 990, and the plurality of processing circuits 990 may realize the function of the "units" in cooperation.

The function of the simulation reproducing apparatus 100 may be realized by a combination of software and hardware. That is, a part of the "units" may be realized by software, and the rest of the "units" may be realized by hardware.

Embodiments are examples of preferred modes and are not intended to limit the technical scope of the present invention. An Embodiment may be implemented partially or in combination with other Embodiments. The procedure described using a flowchart or the like may be changed as appropriate.

REFERENCE SIGNS LIST

100: simulation reproducing apparatus, 110: acceptance control unit, 120: simulation unit, 121: time control unit, 122: execution unit, 123: image generation unit, 130: reproduction unit, 131: time control unit, 132: state management unit, 133: image generation unit, 134: period calculation unit, 191: storage unit, 195: accepting unit, 196: display unit, 200: state image, 201: time part, 202: LED part, 203: switch part, 204: sensor part, 205: register part, 210: trace data, 220: time specified image, 221: time part, 222: specified time axis, 223: knob, 224: auxiliary line, 225: state time axis, 226: change line, 227: condition time axis, 228: condition establishment period, 229: condition identifier, 230: condition data, 241: state identifier, 242: comparison operator, 243: numerical value, 244: condition identifier, 245: logical operator, 246: condition identifier, 247: negation operator, 248: negation operator, 249: logical value, 901: processor, 902: memory, 903: auxiliary storage device, 907: input device, 908: display, 990: processing circuit.

The invention claimed is:

1. A simulation reproducing apparatus comprising:
an input device to accept, after simulation of a state change of a target system, a specified time, which is a time in a simulation period being a target of the simulation of the state change of the target system;
a processing circuitry to:
select a change time corresponding to the specified time from trace data, which is data obtained by the simulation of the state change of the target system and is data including change times at which a state of the target system has changed and state values indicating the state of the target system,
obtain a state value corresponding to the selected change time from the trace data, and
generate a state image indicating a state corresponding to the obtained state value; and
a display to display the generated state image, wherein:
the processing circuitry generates a time specified image, which is an image used for specifying the specified time and is an image including a state time axis with a symbol attached to a position corresponding to each change time,
the display displays the time specified image, and
the input device accepts a time specified via the time specified image as the specified time.

2. The simulation reproducing apparatus according to claim 1, wherein:
the time specified image comprises a specified time axis arranged in parallel with the state time axis, a knob moving along the specified time axis, and a symbol moving along the state time axis in conjunction with the knob, and
the input device accepts a time specified by movement of the knob as the specified time.

3. The simulation reproducing apparatus according to claim 1, wherein the processing circuitry:
calculates a condition establishment period in which a conditional expression related to the state value is established using the trace data, and
includes a condition time axis indicating the condition establishment period separately from other periods in the time specified image.

4. The simulation reproducing apparatus according to claim 3, wherein:
the input device accepts condition information including a conditional expression, and
the processing circuitry:
registers the accepted condition information in condition data, and
calculates a period in which the conditional expression included in the condition information registered in the condition data is established, as the condition establishment period.

5. The simulation reproducing apparatus according to claim 4, wherein:
each condition information registered in the condition data includes a condition identifier,
the input device accepts condition specification information including the condition identifier, and
the processing circuitry selects the condition information identified by the condition identifier included in the condition specification information from the condition data and calculates a period in which the conditional expression included in the selected condition information is established, as the condition establishment period.

6. The simulation reproducing apparatus according to claim 4, wherein:
the condition data includes a plurality of condition groups,
each of the plurality of condition groups includes a group identifier and one or more condition information,
at least one of the one or more condition information includes the group identifier, and
the processing circuitry calculates the condition establishment period for the one or more condition information included in the condition group identified by the group identifier included in the one or more condition information after the conditional expression included in the one or more condition information including the group identifier is established.

7. The simulation reproducing apparatus according to claim 4, wherein:
the processing circuitry controls a reproduction time,
at least one of the condition information registered in the condition data includes time control information for specifying a method of advancing the reproduction time,
the processing circuitry:
calculates a time at which the conditional expression included in the condition information including the time control information is established and registers the calculated time in a time control list in association with the time control information included in the condition information,
changes the method of advancing the reproduction time in accordance with the time control information associated with the calculated time, after the reproduction time reaches the same time as the calculated time registered in the time control list,
obtains a state value corresponding to a change time, which is the same time as the reproduction time from the trace data when the reproduction time reaches the same time as the change time included in the trace data, and
generates a state image indicating a state corresponding to the obtained state value, and
the display displays the generated state image.

8. The simulation reproducing apparatus according to claim 7, wherein:
the processing circuitry temporarily stops updating the reproduction time after the reproduction time reaches the same time as a time associated with a temporary stop.

9. The simulation reproducing apparatus according to claim 7, wherein:
the processing circuitry changes a speed at which the reproduction time is advanced after the reproduction time reaches the same time as a time associated with a speed change.

10. A non-transitory computer-readable recording medium storing a simulation reproducing program to cause a computer to execute:
an accepting process of accepting, after simulation of a state change of a target system, a specified time, which is a time in a simulation period being a target of the simulation of the state change of the target system;
a state management process of selecting a change time corresponding to the specified time from trace data, which is data obtained by the simulation of the state change of the target system and is data including change times at which a state of the target system has changed and state values indicating the state of the target system, and of obtaining a state value corresponding to the selected change time from the trace data;

an image generation process of generating a state image indicating a state corresponding to the obtained state value; and a display process of displaying the generated state image, wherein:

the image generation process includes generating a time specified image, which is an image used for specifying the specified time and is an image including a state time axis with a symbol attached to a position corresponding to each change time, the display process includes displaying the time specified image, and the accepting process includes accepting a time specified via the time specified image as the specified time.

* * * * *